United States Patent
Suzuki et al.

(10) Patent No.: US 6,522,496 B1
(45) Date of Patent: Feb. 18, 2003

(54) STORAGE UNIT

(75) Inventors: Nobuyuki Suzuki, Kanagawa (JP);
Masakazu Hirano, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/481,256

(22) Filed: Jan. 11, 2000

(30) Foreign Application Priority Data

Mar. 3, 1999 (JP) .......................................... 11-056151
Nov. 2, 1999 (JP) .......................................... 11-313055

(51) Int. Cl.⁷ ............................................. G11B 5/596
(52) U.S. Cl. ................................. 360/78.04; 360/55
(58) Field of Search .......................... 360/78.01, 78.04, 360/78.08, 78.09, 75, 61, 55

(56) References Cited

U.S. PATENT DOCUMENTS 5,550,998 A * 8/1996 Willis et al. ............... 395/441
6,101,065 A * 8/2000 Alfred et al. .............. 360/78.04
6,388,413 B1 * 5/2002 Ng et al. ................... 318/560

FOREIGN PATENT DOCUMENTS

| JP | 547109 | 2/1993 |
| JP | 6103683 | 4/1994 |

* cited by examiner

Primary Examiner—Andrew L. Sniezek
(74) Attorney, Agent, or Firm—Greer, Burns & Crain, Ltd.

(57) ABSTRACT

This invention intends to provide a storage unit capable of improving data transmission efficiency and reducing a seek time. The storage unit of this invention comprises a read/write head for carrying out read/write with respect to a recording medium, a VCM for moving the read/write head during seek operation, and a seek command executing section for outputting a VCM voltage when a seek start permission signal is inputted from a seek timing issuing section. The seek timing issuing section outputs a seek start permission signal in order to start the seek operation to the seek command executing section at a timing at which the read/write operation ends.

8 Claims, 34 Drawing Sheets

STORAGE UNIT

FIELD OF THE INVENTION

The present invention relates to a storage unit for use as an external storage unit for a computer. More particularly this invention relates to a storage unit capable of improving the data transmission efficiency and reducing the seek time.

BACKGROUND OF THE INVENTION

As an external storage unit for computer, a storage unit employing a circular magnetic disk unit as a storage medium has been used. Upon read/write (R/W) operation in this storage unit, a seek operation for moving a read/write head to a desired track on the recording medium is necessary. Because it takes time for command processing until the read/write head actually moves since a seek command for instructing this seek operation is issued, a seamless seek operation can not be achieved. Further, because an inductance component is contained in a unit for driving the read/write head, there exists a voltage transition period. Thus, a delay time occurs until the read/write head actually moves since a voltage is supplied to this storage unit, and this delay time further prolongs the seek time. The above-mentioned decline in the data transmission efficiency and prolongation of the seek operation are important problems which obstruct increased density trend of the storage unit and therefore, a method for solving such a problem has been demanded.

FIG. 33 is a block diagram showing a structure of a conventional storage unit 2. The storage unit 2 is connected to a host 1 such as computer through a small computer system interface (SCSI) bus and executes read/write to a recording medium (magnetic disk) (not shown) based on a read/write request command S01 from this host 1. Here, the aforementioned read/write request command S01 contains target cylinder information for instructing a cylinder in the recording medium, target sector information for instructing a sector in the recording medium and head information for instructing a read/write head 13 using at the time of the read/write operation. A sector specified by the target cylinder information and the sector information is a region to be subjected to read/write.

In this storage unit 2, a command/status processing section 3, a position information conversion section 4, a seek command issuing section 5 and a read/write control section 6 compose a upper level controller 7. In this upper level controller 7, the command/status processing section 3 carries out such processing as reception of a read/write request command S01 from the host 1 and report of status of the storage unit 2 to the host 1. The command/status processing section 3 outputs the target cylinder information, target sector information and target head information contained in the received read/write request command S01 to the position information conversion section 4 as local block address (LBA) S02.

The position information conversion section 4 outputs the target cylinder information and head information of the target cylinder information, target sector information and head information obtained from the above LBA S02, as the position information S03 to the seek command issuing section 5 and outputs the target sector information to the read/write control section 6 as the read/write object sector data S07. Here, the read/write control section 6 controls the read/write operation. The seek command issuing section 5 is triggered when a read/write completion report S06 which indicates that a last read/write operation is completed is inputted from the read/write control section 6 so as to issue a seek command S04 for carrying out the seek operation and this seek command is outputted to a detailed target position setting section 8.

A head positioning control section 10 controls positioning of a read/write head 13 described later on a recording medium (not shown) and comprises the detailed target position setting section 8 and a seek command executing section 9. The position of the read/write head 13 differs during reading and writing due to the influence of yaw angle. The detailed target position setting section 8 outputs target position to the seek command executing section 9 as the detailed target position information S10 considering a correction corresponding to the difference in this yaw angle.

The detailed target position setting section 8 receives a feedback of the present position S23 of the read/write head 13 which will be described later and then outputs a detailed target position information S10. The seek command executing section 9 outputs a voice coil motor (VCM) voltage S11 based on the detailed target position information S10. A power amplifier 11 amplifies the aforementioned VCM voltage S11 and supplies a VCM current S12 which is a driving current to the VCM 12.

A disk enclosure (DE) 16 includes the voice coil motor (VCM) 12, the read/write head 13, a preamplifier 14 and a position demodulator 15 in a sealed condition. The aforementioned VCM 12 moves the read/write head 13 in a radius direction between sectors during the seek operation and this motor is driven by the VCM current S12 supplied from the power amplifier 11. Here, the amount of movement of the read/write head 13 is controlled by changing the VCM current S12. The read/write head 13 writes read/write data S19 (write data here) supplied from the read/write control section 6 on a recording medium using a magnetic field generated by a recording current amplified by a preamplifier 14. The read/write head 13 reads out data recorded in the recording medium magnetically as a playback voltage and outputs it as the read/write data S19 (read data here) to the read/write control section 6 through the preamplifier 14.

The read/write head 13 detects a servo pattern for positioning recorded in the recording medium and the preamplifier 14 outputs this detection result to the position demodulator 15 as a servo signal S13. The position demodulator 15 demodulates the present position S23 of the read/write head 13 from the aforementioned servo signal S13 and outputs it to the detailed target position setting section 8. Further, the position demodulator 15 obtains a number of a sector which the read/write head 13 currently tracks from the aforementioned demodulation result and outputs it to the read/write control section 6 as the present position sector number S09. Here, the read/write control section 6 determines whether or not the read/write operation is complete from the present position sector number S09 and read/write data S19. If the read/write operation is complete, the read/write control section 6 outputs the read/write completion report S06 to the command/status processing section 3 as well as to the seek command issuing section 5. Then, the detailed target position setting section 8 determines whether or not the seek operation is complete based on the present position S23. If the seek operation is complete, the detailed target position setting section 8 outputs the seek completion report S08 to the read/write control section 6.

Next, with reference to FIG. 34, mainly the read/write operation and seek operation in the conventional storage unit 2 will be described. In the processing and operation of the storage unit 2, as shown in the upper half of FIG. 34, command processing (1), seek operation, read/write operation and command processing (2), by which a single set is composed, are repeated in time series manner.

Here, the command processing (1) comprises a processing on the read/write request command S01 in the command/status processing section 3, target position information conversion processing in the position information conversion section 4 and an issuing processing of the seek command S04 in the seek command issuing section 5. Further, the seek operation is an operation for moving the read/write head 13 by the seek command executing section 9, power amplifier 11 and VCM 12. The read/write operation is a read/write operation of the read/write head 13 with respect to the recording medium by a control of the read/write control section 6. The command processing (2) is a processing for outputting the read/write completion report S06 from the read/write control section 6 to the command/status processing section 3 as well as to the read/write control section 6.

If the read/write request command S01 is inputted from the host 1 to the command/status processing section 3 at time $t_1$ shown in the upper half of FIG. 34, the command/status processing section 3 generates LBA S02 from this read/write request command S01 and outputs this to the position information conversion section 4. Consequently, the position information conversion section 4 outputs the position information S03 to the seek command issuing section 5 and then outputs the read/write object sector data S07 to the read/write control section 6. If the position information S03 is inputted after the input of the read/write completion report S06, the seek command issuing section 5 outputs the seek command S04 to the detailed target position setting section 8 at time $t_2$. With this, the command processing (1) ends.

When the seek command S04 is inputted to the detailed target position setting section 8 at time $t_2$, the seek operation is started. When the detailed target position information S10 is outputted to the seek command executing section 9 from the detailed target position setting section 8, the VCM voltage S11 is outputted to the power amplifier 11 from the seek command executing section 9. Consequently, the VCM current S12 is supplied to the VCM 12 so as to drive it, so that the read/write head 13 begins to move on a recording medium.

When the read/write head 13 moves up to a desired position after receiving a feedback of the present position S23 from the position demodulator 15 at time $t_3$, the detailed target position setting section 8 outputs the seek completion report S08 to the read/write control section 6. Consequently, at time $t_3$, the read/write control section 6 waits until the read/write head 13 is placed at a desired sector obtained from the read/write object sector data S07, based on a present position sector number S09 indicating a sector number in which the read/write head 13 is currently located. If the read/write head 13 is located at a desired sector, read/write data S19 is supplied to the read/write head 13 from the read/write control section 6 through the preamplifier 14, thereby achieving the read/write operation. Then, if the aforementioned read/write operation is terminated at time $t_4$, the read/write control section 6 outputs the read/write completion report S06 to the command/status processing section 3 as well as to the seek command issuing section 5. With this, the read/write operation corresponding to a single set ends.

When the aforementioned read/write completion report S06 is inputted to the command/status processing section 3 as well as to the seek command issuing section 5 at time $t_5$, the aforementioned command processing (1) is carried out by the command/status processing section 3, position information conversion section 4 and seek command issuing section 5. After that, the seek operation is carried out at time $t_6$ and the read/write operation is carried out at time $t_7$. Finally, the command processing (2) is carried out at time $t_8$.

As described with reference to FIG. 34, in the command processing (2), the read/write completion report S06 from the read/write control section 6 is received by the command/status processing section 3 as well as by the seek command issuing section 5 at time $t_5$ and after the seek command S04 is issued from the seek command issuing section 5 for a next command processing (1), the seek operation is carried out at time $t_6$. However, as evident from this figure, in the conventional storage unit 2, it takes time $T_1$ (time $t_4$–time $t_6$) for carrying out the command processing (2) and command processing (1) until a next seek operation is carried out after a last read/write operation is terminated. Thus, the conventional storage unit has such a problem that data transmission efficiency declines by an amount corresponding to this time $T_1$.

Further, in the conventional storage unit 2, because a coil is used for the VCM 12 for moving the read/write head 13, if the VCM current S12 is inputted from the power amplifier 11, it takes time until a steady condition is achieved because of inductance component of this coil. In other words, even if the VCM voltage S11 is supplied to the power amplifier 11 from the seek command executing section 9 at time $t_6$ shown in FIG. 34, until the VCM current S12 becomes a steady current, the read/write head 13 does not move. Therefore, the conventional storage unit 2 has such a problem that a seek time required for the seek operation of the read/write head 13 is prolonged because of an influence of inductance component of the VCM 12.

SUMMARY OF THE INVENTION

Accordingly, the present invention has been made in views of the above problems and therefore it is an object of the invention to provide a storage unit capable of improving the data transmission efficiency besides reducing the seek time.

According to the first aspect of the present invention, when the seek operation is to be carried out, the control unit carries out a processing necessary for the seek operation before the read/write operation ends. That is, the processing necessary for the seek operation is carried out in parallel to the read/write operation and therefore, a time required for the above processing is saved.

According to the second aspect of the present invention, when the seek operation is to be carried out, the timing means obtains a timing for terminating the processing when the read/write operation is terminated. Then, the driving unit drives the seek unit at the above timing. Therefore, in this case, the seek operation is carried out at the same time when the read/write operation ends.

According to the third aspect of the present invention, the initial value is counted down according to the sector pulse that is inputted each time when the head passes a sector on the recording medium. Further, when this count value becomes zero, the seek unit is driven by the driving unit which is also the time when the read/write operation ends, and in this way the seek operation is carried out.

According to the fourth aspect of the present invention, the seek unit is driven by the driving unit at a timing at which the sector position in which the read/write operation is terminated matches with a sector position in which the head is positioned which is also the time at which the read/write operation is terminated, and in this way the seek operation is carried out.

According to the fifth aspect of the present invention, the initial value is counted down according to the byte pulse that is inputted each time when the head passes a byte on the recording medium. Further, when this count value becomes zero, the seek unit is driven by the driving unit which is also the time when the read/write operation ends, and in this way the seek operation is carried out.

According to the sixth aspect of the present invention, the seek unit is driven by the driving unit at a timing at which the byte position in which the read/write operation terminates matches with the byte position in which the head is positioned which is also the time when the read/write operation is terminated, and in this way the seek operation is carried out.

According to the seventh aspect of the present invention, the seek unit is driven by the driving unit at a timing in which the counting result of the timer matches with the time at which the read/write operation is terminated which is also the time when the read/write operation is terminated, and in this way the seek operation is carried out.

According to the eighth aspect of the present invention, the seek unit is driven by the driving unit at a timing at which the time required for the read/write operation matches with the counting result of the timer which is also the time when the read/write operation is terminated, and in this way the seek operation is carried out.

Other objects and features of this invention will become apparent from the following description with reference to the accompanying drawings.

DESCRIPTION OF THE PREFERRED EMBODIMENTS

Hereinafter, first to eleventh embodiments of the storage unit of the present invention will be described with reference to the accompanying drawings.

Figure 1:
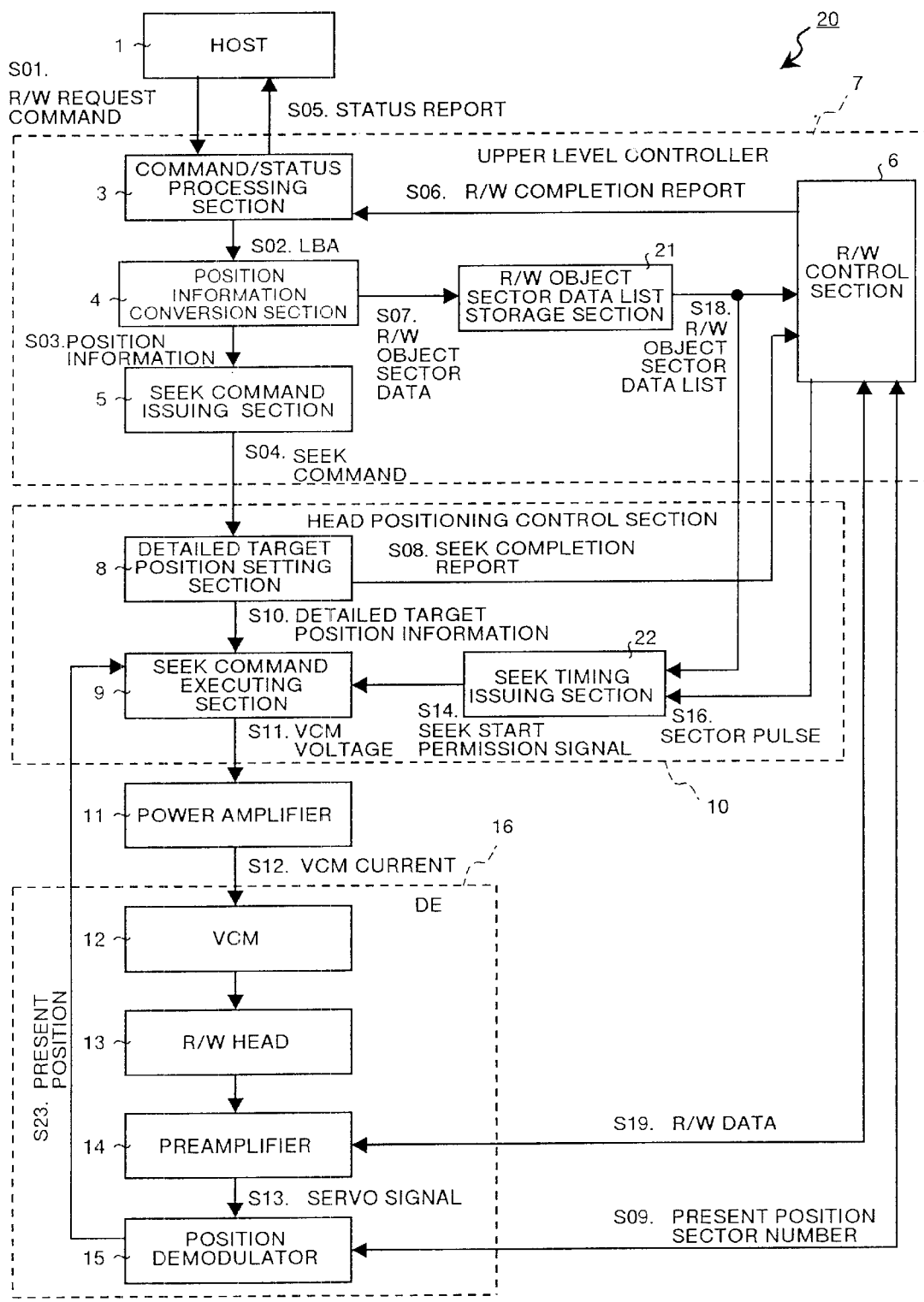
FIG. 1 is a block diagram showing a structure of a storage unit 20 according to a first embodiment of the present invention.
Figure 33:
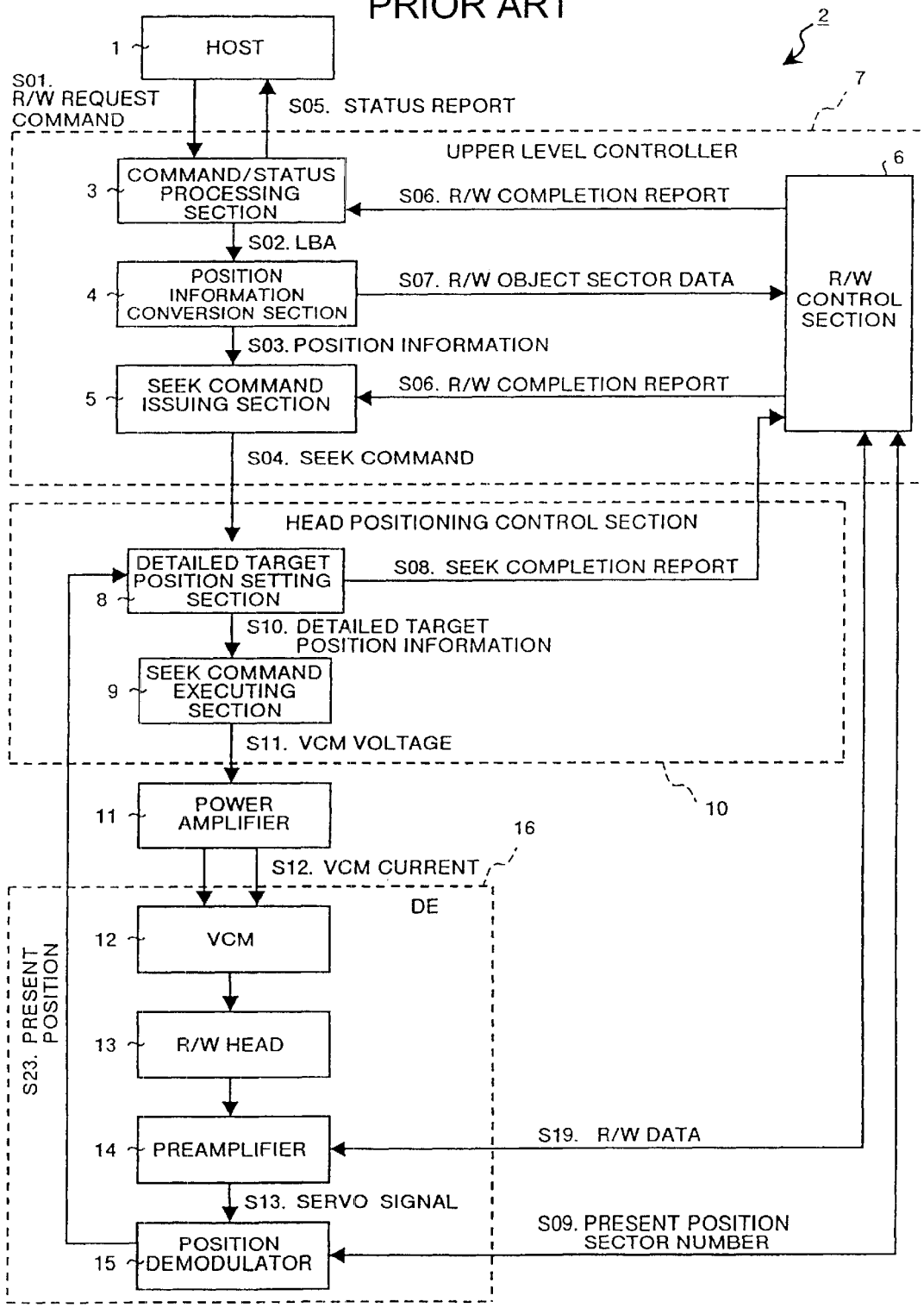
FIG. 33 is a block diagram showing the structure of a conventional storage unit 2.

FIG. 1 is a block diagram showing a structure of a storage unit 20 according to a first embodiment of the present invention. Same reference numerals are provided to the portions that are similar to the portions in FIG. 33. Referring to FIG. 1, a read/write object sector data list storage section 21 is provided in a upper level controller 7 and a seek timing issuing section 22 is provided in a head positioning control section 10. In this storage unit 20, as shown in the lower half of FIG. 34, a processing (A) is carried out concurrently with the read/write operation and at time $t_5$ when the read/write operation ends, seek operation is started immediately.

The aforementioned read/write object sector data list storage section 21 stores a plurality of sectors of the read/write object sector data S07 inputted from the position information conversion section 4. The read/write object sector data list storage section 21 outputs read/write object sector data list S18 in which a plurality of the read/write object sector data S07 is listed in the order of read/write to the read/write control section 6 as well as to the seek timing issuing section 22. In this read/write object sector list S18, sectors in which the a read/write head 13 is positioned during operation of the read/write operation are arranged in order.

The read/write control section 6 receives a feedback of a present position sector number S09 and outputs a sector pulse S16 to the seek timing issuing section 22 each time when the read/write head 13 passes a sector of the recording medium. The seek timing issuing section 22 issues a timing for executing a seek command at the seek command executing section 9 based on the aforementioned read/write sector data list S18 and sector pulse S16 and outputs a seek start permission signal S14 to the seek command executing section 9. In other words, the seek command executing section 9 outputs the VCM voltage S11 to the power amplifier 11 when the aforementioned seek start permission signal S14 is inputted.

Figure 2:
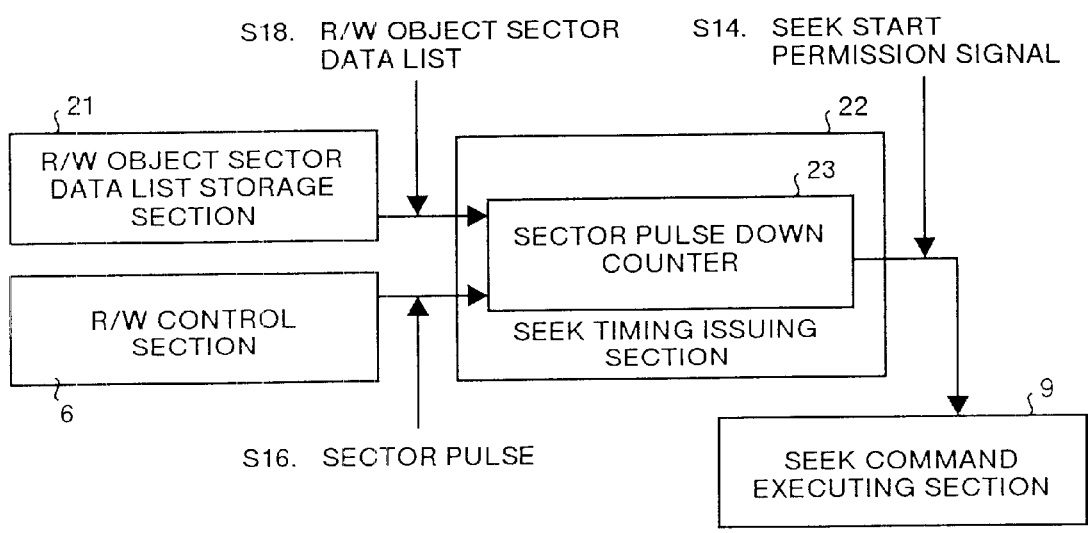
FIG. 2 is a block diagram showing a structure of a seek timing issuing section 22 shown in FIG. 1.

As shown in FIG. 2, the seek timing issuing section 22 is provided with a sector pulse down counter 23. This sector pulse down counter 23 counts down its count value from an initial value (see FIG. 3) each time when the sector pulse S16 is inputted from the read/write control section 6.

Figure 4:
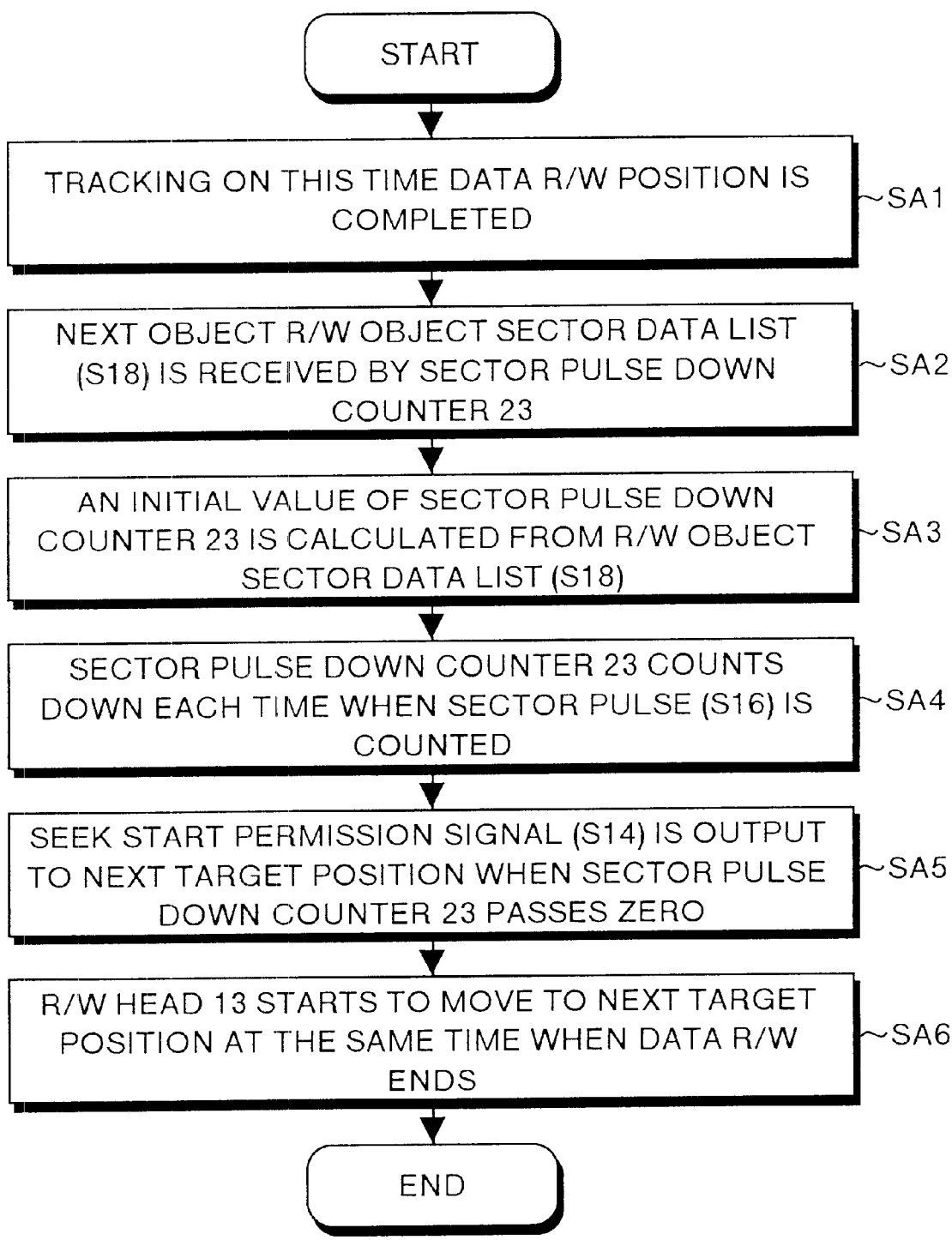
FIG. 4 is a flow chart for explaining an operation of the storage unit 20 according to the first embodiment of the present invention.
Figure 5:
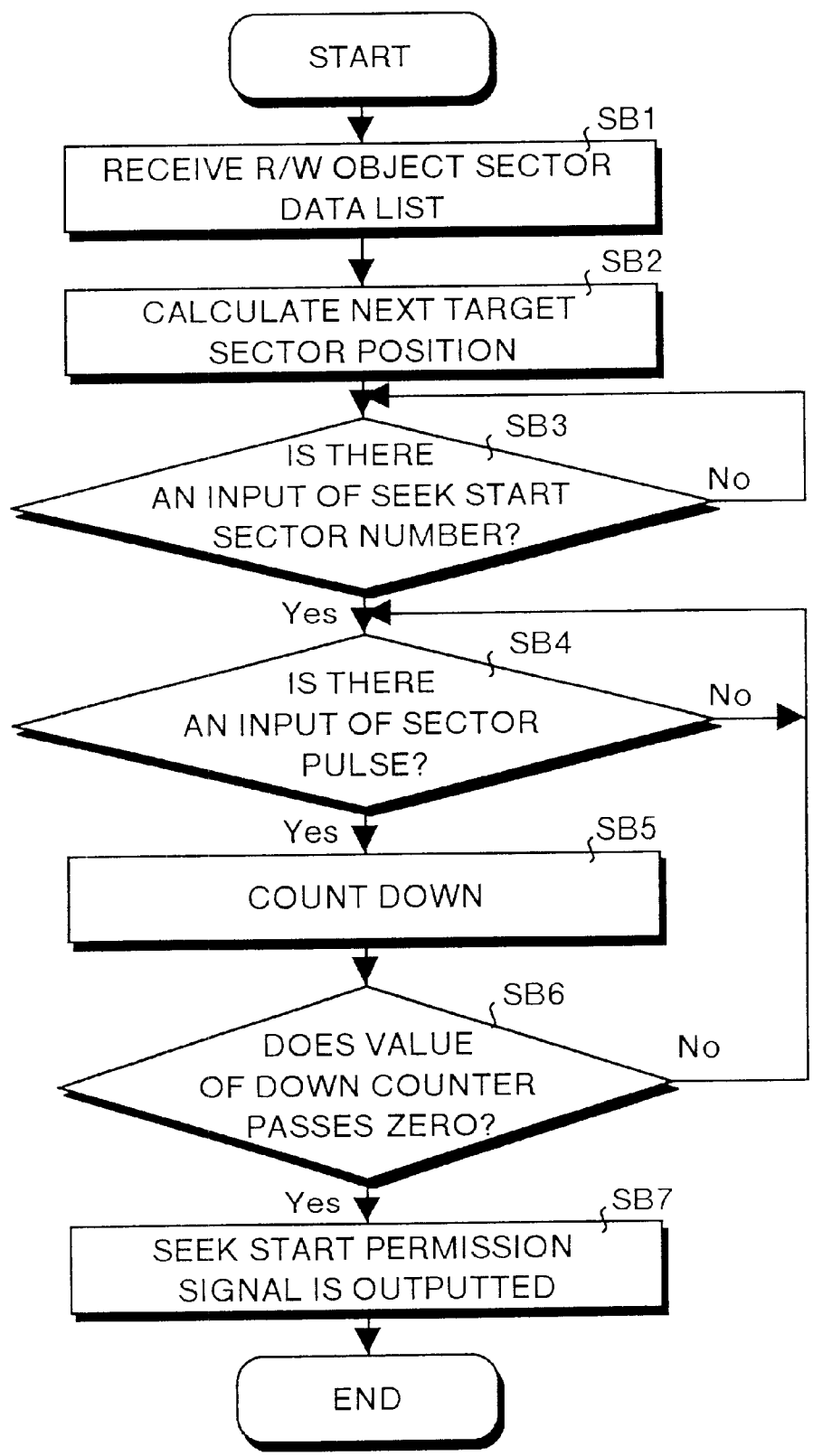
FIG. 5 is a flow chart for explaining an operation of the seek timing issuing section 22 shown in FIG. 1.

Referring to a flowchart shown in FIGS. 4, 5, an operation of the storage unit 20 according to the first embodiment will be described. First of all, an outline of its entire operation will be described with reference to FIG. 4. In this case, the seek command executing section 9 has already received detailed target position information S10 and it is assumed that it is in waiting condition. In step SA1 shown in FIG. 4, the read/write head 13 carries out on-track at a this time read/write position during this read/write operation. In step SA2, the sector pulse down counter 23 (in the seek timing issuing section 22) receives a read/write object sector data list S18 from the read/write object sector data list storage section 21.

Figure 3:
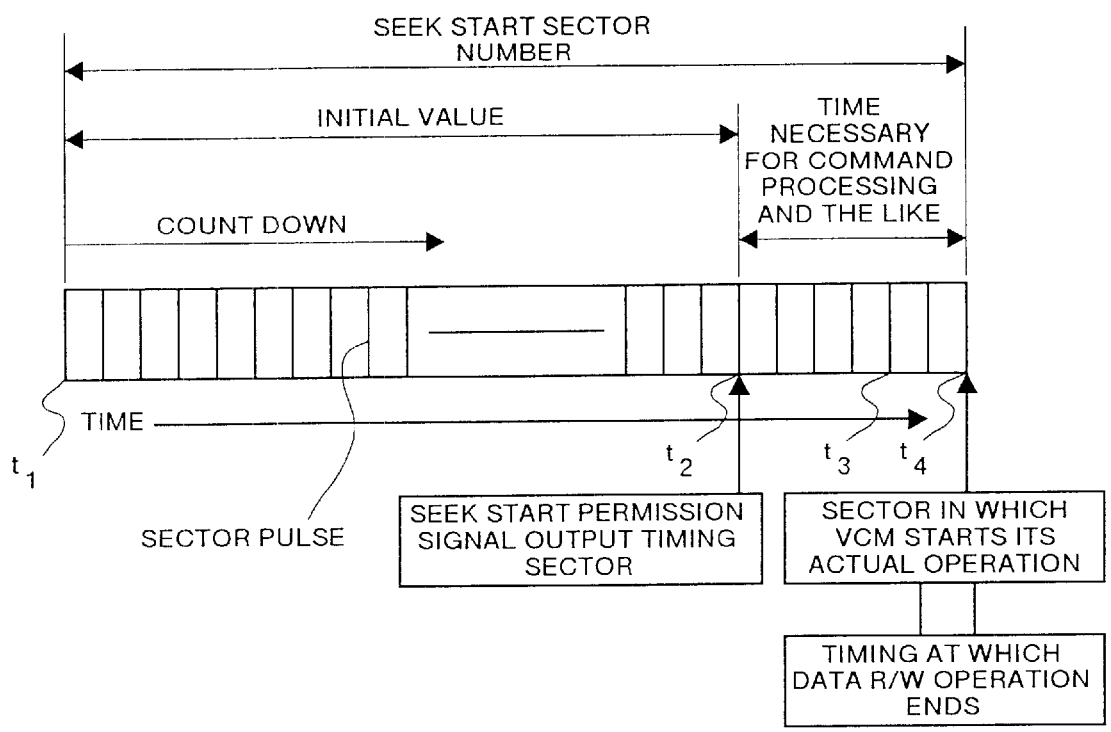
FIG. 3 is a diagram for explaining an operation of the storage unit 20 according to the first embodiment of the present invention.

As a result, in step SA3, the seek timing issuing section 22 obtains a difference between a sector in which the read/write head 13 is currently tracking and a sector at the time of read/write operation end as a seek startup sector number shown in FIG. 3 from read/write object sector data list S18. Then, the seek timing issuing section 22 obtains an initial value of the sector pulse down counter 23 by subtracting a number of sectors corresponding to time necessary for command processing or the like from this seek start sector number.

In step SA4, during read/write operation, the sector pulse down counter 23 starts count-down of a count value according to the sector pulse S16 to be inputted each time when the read/write head 13 passes a sector (time $t_1$ in FIG. 3). Then, if the count value of the sector pulse down counter 23 becomes zero at time $t_2$ shown in FIG. 3, in step SA5, the seek timing issuing section 22 outputs the seek start permission signal S14 to the seek command executing section 9. As a result, the seek command executing section 9 outputs the VCM voltage S11 to the power amplifier 11 shown in FIG. 1 at time $t_3$ slightly earlier than the time $t_4$ shown in FIG. 3 after the command processing is carried out. Here, a time interval from time $t_3$ to time $t_4$ shown in FIG. 3 is time until a steady condition is reached since VCM current S12 is inputted to the VCM 12. That is, the above time is set up to compensate for prolongation of seek time by inductance component of the aforementioned VCM 12.

When time $t_4$ shown in FIG. 3 is reached, in step SA6, the seek operation is started, that is, the read/write head 13 is moved by the VCM 12 at the same time when the read/write operation ends. As a result, the read/write head 13 is moved toward a next target position. A series of processing carried out from time $t_1$ to time $t_4$ shown in FIG. 3 corresponds to processing (A) from time $t_4$ to time $t_5$ shown in the lower half of FIG. 34.

Next, an operation of the seek timing issuing section 22 shown in FIG. 2 will be described with reference to FIG. 5. In step SB1 shown in this Figure, the sector pulse down counter 23 (in the seek timing issuing section 22) receives the read/write object sector data list S18. In step SB2, a next target sector in the read/write head 13 is obtained based on the aforementioned read/write object sector data list S18. In step SB3, whether or not a seek start sector number (see FIG. 3) has been inputted is determined, and if a result of this determination is "NO", the same determination is repeated. If the result of this determination is "YES", in step SB4, whether or not the sector pulse S16 has been inputted is determined. If the result of this determination is "NO", the same determination is repeated.

If the sector pulse S16 is inputted, in step SB5, the sector pulse down counter 23 counts down the set initial value (see FIG. 3) and then the control proceeds to step SB6. In step SB6, whether or not the count value in the sector pulse down counter 23 passes zero is determined, and if the determination result is "NO", the processing is returned to step SB4, in which the above steps are repeated. If the count value of the sector pulse down counter 23 becomes zero at time $t_2$ shown in FIG. 3, the sector pulse down counter 23 considers the result of determination in step SB6 as "YES". As a result, in step SB7, the seek timing issuing section 22 outputs the seek start permission signal S14 to the seek command executing section 9. When the time $t_4$ shown in FIG. 3 is reached, like the above described operation, the read/write operation is terminated and the seek operation of the read/write head 13 is started.

As described above, in the storage unit 20 of the first embodiment, when the count value in the sector pulse down counter 23 of the seek timing issuing section 22 becomes zero, a command is executed in the seek command executing section 9 and a timing in which the above count value becomes zero is set up considering a delay in the command processing and VCM 12. Therefore, the seek operation can be started at the same time when the read/write operation is terminated. Consequently, as shown in the lower half of FIG. 34, time required for the write/read operation on all data is reduced by a time difference $\Delta t$ as compared to the conventional storage unit 20. Thus, according to the storage unit 20 of the first embodiment, the data transmission efficiency is improved as well as the seek time is reduced.

In the storage unit 20 of the first embodiment, considering command processing and initial response of the VCM 12 as shown in FIG. 3, the time $t_2$ is adopted as a timing for outputting the seek start permission signal. However, if the initial response time of the VCM 12 and the like can be neglected, it is permissible to adopt time $t_4$ in which the read/write operation ends as the aforementioned timing. This is the same for the second to eleventh embodiments which will be described later.

Further, in the storage unit 20 of the first embodiment, it is permissible to quicken a timing for outputting the seek start permission signal (FIG. 3; time $t_2$) for read operation as compared to write operation. This is because, during the read operation, not so high positioning accuracy of the read/write head 13 is required as compared to the write operation. Therefore, in this case, the data transmission efficiency is further improved as compared to the write operation. A method for shifting the above timing between the read operation and the write operation is also effective in the second to eleventh embodiments which will be described later.

Figure 6:
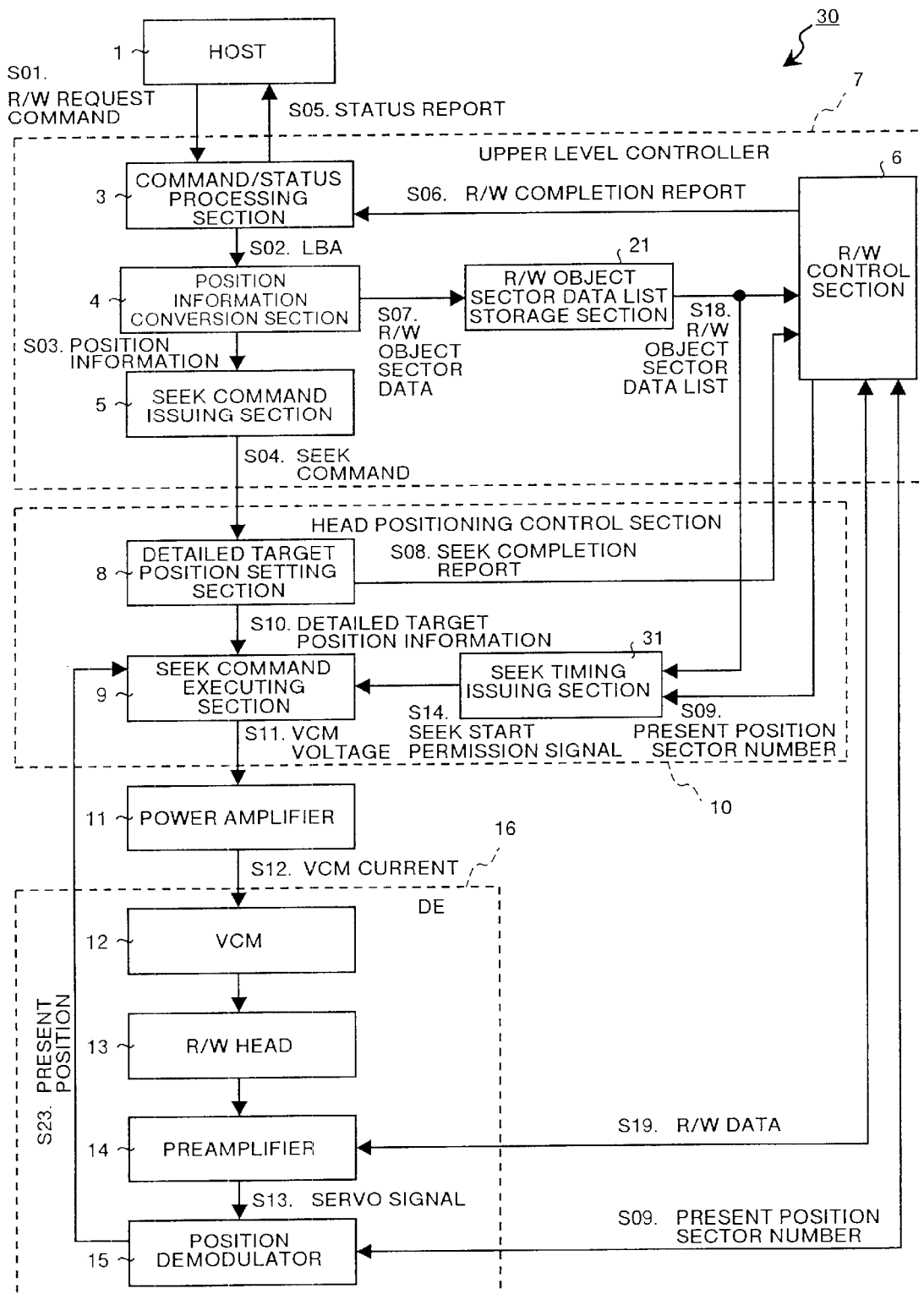
FIG. 6 is a block diagram showing a structure of a storage unit 30 according to a second embodiment of the present invention.
Figure 34:
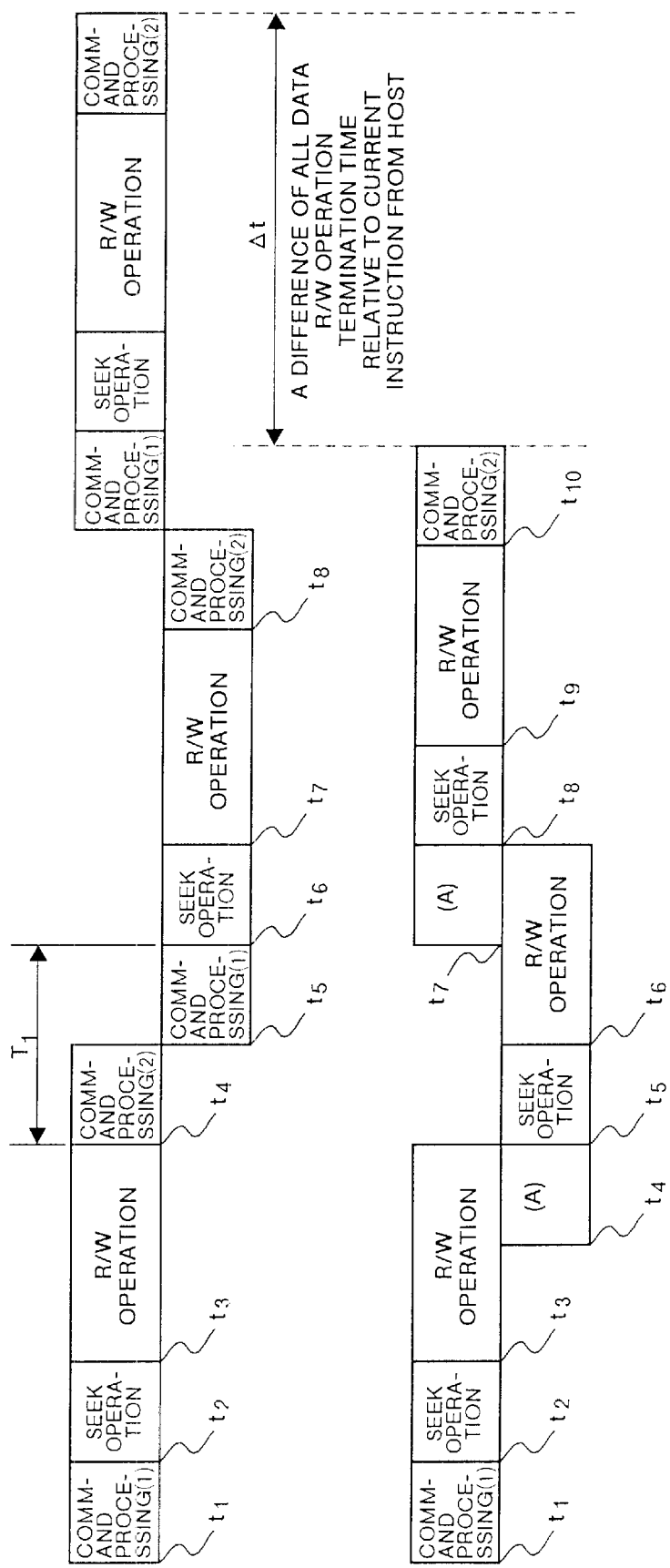
FIG. 34 is a diagram showing an entire processing in the conventional storage unit 2 and storage units according to the first to sixth embodiments of the present invention in time series.

FIG. 6 is a block diagram showing a structure of the storage unit 30 according to the second embodiment of the present invention. In this Figure, the same reference numerals are provided to the sections corresponding to those in FIG. 1. In FIG. 6, a seek timing issuing section 31 is newly provided instead of the seek timing issuing section 22 shown in FIG. 1. Further, the read/write control section 6 outputs a present position sector number S09 to this seek timing issuing section 31. This storage unit 30 carries out the processing (A) during read/write operation as shown in FIG. 34 in the same manner as the storage unit 20 of the first embodiment and then carries out the seek operation at time $t_5$ in which the read/write operation ends immediately.

The seek timing issuing section 31 issues a timing for executing the seek command in the seek command executing section 9 based on the read/write object sector data list S18 and present position sector number S09 and outputs the seek start permission signal S14 to the seek command executing section 9.

Figure 7:
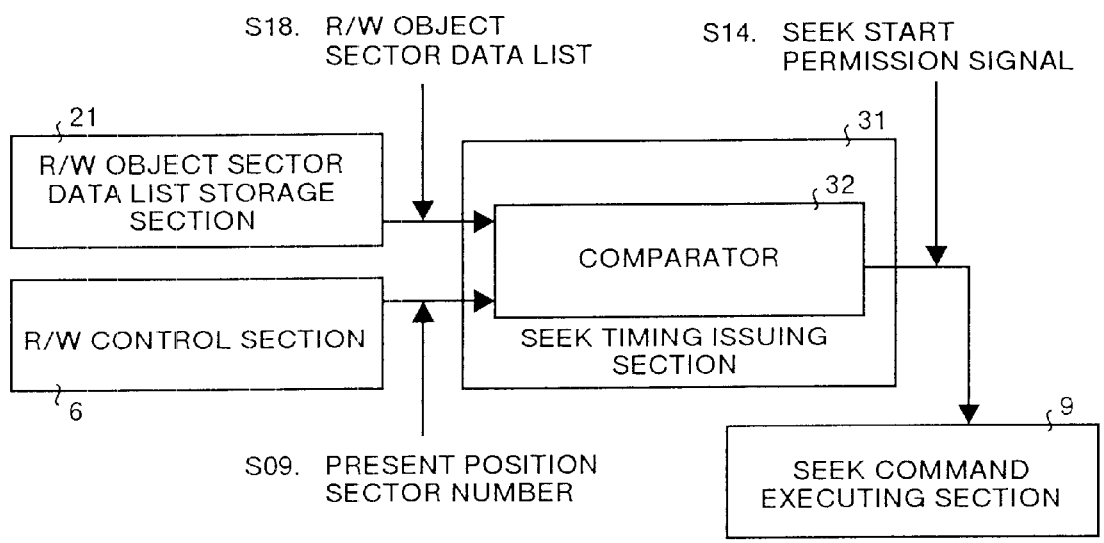
FIG. 7 is a block diagram showing a structure of the seek timing issuing section 31 shown in FIG. 6.
Figure 8:
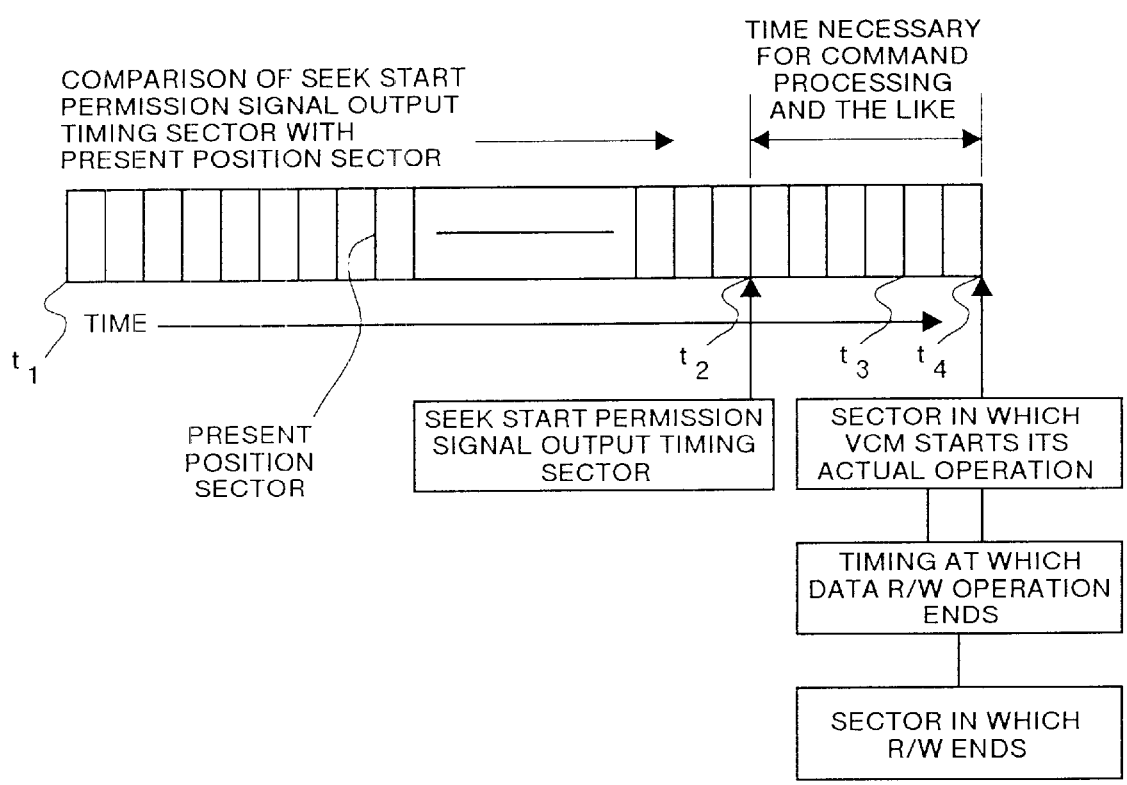
FIG. 8 is a diagram for explaining an operation of the storage unit 30 according to the second embodiment of the present invention.

Further, the seek timing issuing section 31 is provided with a comparator 32 as shown in FIG. 7. This comparator 32 compares a present sector position of the read/write head 13 obtained from the present position sector number S09 with the seek start permission signal output timing sector shown in FIG. 8. Here, the aforementioned seek start permission output signal timing sector is the same sector as the seek start permission output signal timing sector shown in FIG. 3. That is, the seek start permission output signal timing sector shown in FIG. 8 is located to the left by the number of sector corresponding to time necessary for command processing or the like with respect to a sector in which the present read/write operation ends and determines a timing for outputting the seek start permission signal S14 to the seek command executing section 9.

Figure 9:
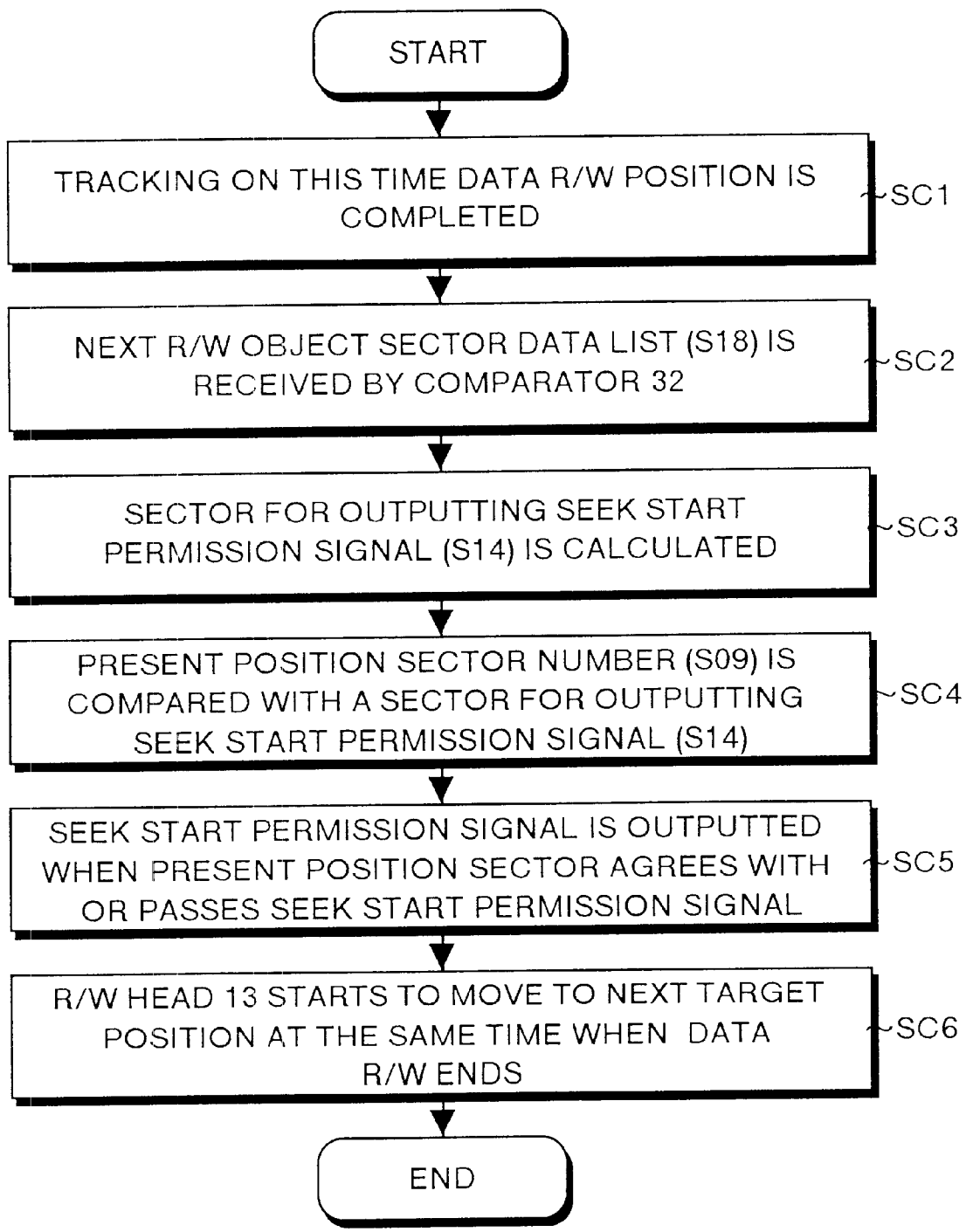
FIG. 9 is a flow chart for explaining an operation of the storage unit 30 according to the second embodiment of the present invention.
Figure 10:
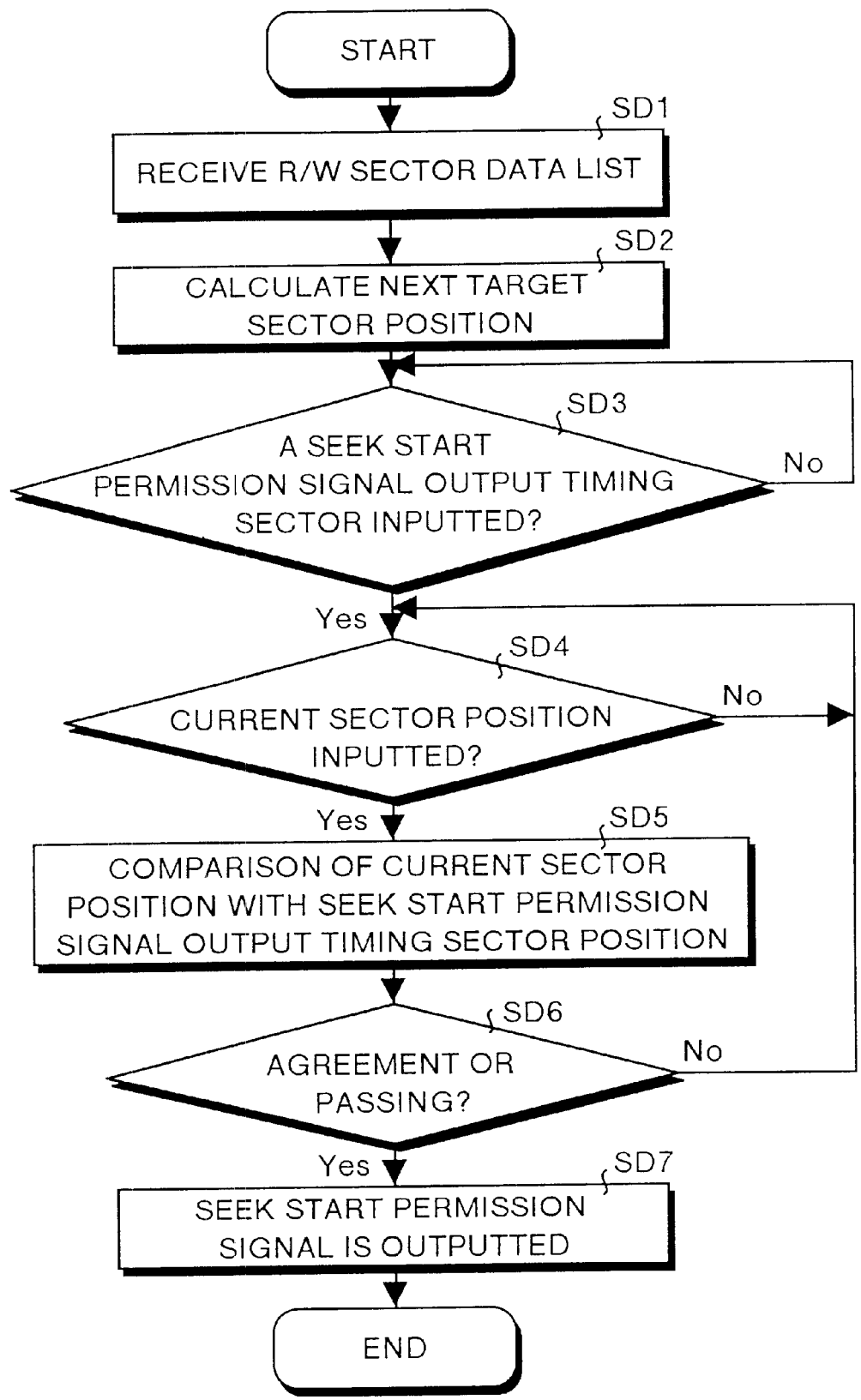
FIG. 10 is a flow chart for explaining an operation of the seek timing issuing section 31 shown in FIG. 6.

Next, an operation of the storage unit 30 according to the second embodiment will be described with reference to the flow charts shown in FIGS. 9, 10. First of all, an outline of its entire operation will be described with reference to FIG. 9. In this case, it is assumed that the seek command executing section 9 has already received detailed target position information S10 and is in waiting condition. In step SC1 shown in FIG. 9, the read/write head 13 tracks a this time read/write position. In step SC2, the comparator 32 (in the seek timing issuing section 31) receives read/write object sector data list S18 from the read/write object sector data list storage 21.

In step SC3, the seek timing issuing section 31 obtains a seek start permission signal output timing sector by subtracting a sector number corresponding to a time necessary for command processing and the like from a sector in which the present read/write operation ends, from the read/write object sector data list S18. In step SC4, a present sector position of the read/write head 13 on reading or writing, obtained from the present position sector number S09 to be inputted by the read/write control section 6 is compared with the aforementioned seek start permission signal output timing sector.

In step SC5, when the aforementioned seek start permission output signal timing sector agrees with the present sector or passes it, the seek timing issuing section 31 outputs the seek start permission signal S14 to the seek command executing section 9. Then, the seek command executing section 9 carries out command processing and after that, outputs the VCM voltage S11 to the power amplifier 11 shown in FIG. 6 at time $t_3$ which is earlier than the time $t_4$ shown in FIG. 8. When the time $t_4$ shown in FIG. 8 is reached, in step SC6, seek operation is started so that the read/write head 13 is moved by the VCM 12 at the same time when the read/write operation ends.

Next, an operation of the seek timing issuing section 31 shown in FIG. 7 will be described with reference to FIG. 10. In step SD1, the comparator 32 (in the seek timing issuing section 31) receives the read/write object sector data list S18. In step SD2, the comparator 32 obtains a position of a next target sector (read/write end sector in FIG. 8) of the read/write head 13 according to the aforementioned read/write object sector data list S18. In step SD3, whether or not the seek start permission signal output timing sector (see FIG. 8) is inputted is determined and if the result of the determination is "NO", then the same determination is repeated. If this result of the determination is "YES", then in step SD4, whether or not the present position sector number S09 is inputted is determined, and if the result of the determination is "NO", then the same determination is repeated.

When the present position sector number S09 is inputted, in step SD5, the comparator 32 compares a present sector position obtained from the present position sector number S09 with the seek start permission output signal timing sector position. In step SD6, whether or not the comparison result of the comparator 32 is agreement (or passing) is determined, and if the result of the determination is "NO", then the processing is returned to step SD4 and the above steps are repeated. Then, if at time $t_2$ shown in FIG. 8, the present sector agrees with (or passes) the seek start permission output signal timing sector, the comparator 32 determines the result of the determination in step SD6 as "YES". As a result, in step SD7, the seek timing issuing section 31 outputs the seek start permission signal S14 to the seek command executing section 9. When the time $t_4$ shown in FIG. 8 is reached, the read/write operation ends like the above operation so that the seek operation of the read/write head 13 is started.

As described above, in the storage unit 30 of the second embodiment, when the comparison result of the comparator 32 in the seek timing issuing section 31 is matching (or passing), a command is executed in the seek command executing section 9 and the seek start permission signal output timing sector is set up considering a delay in the command processing and VCM 12. Therefore, the seek operation can be started at the same time when the read/write operation ends like the aforementioned first embodiment. Thus, according to the storage unit 30 of the second embodiment, the data transmission efficiency is improved and the seek time is reduced.

Figure 11:
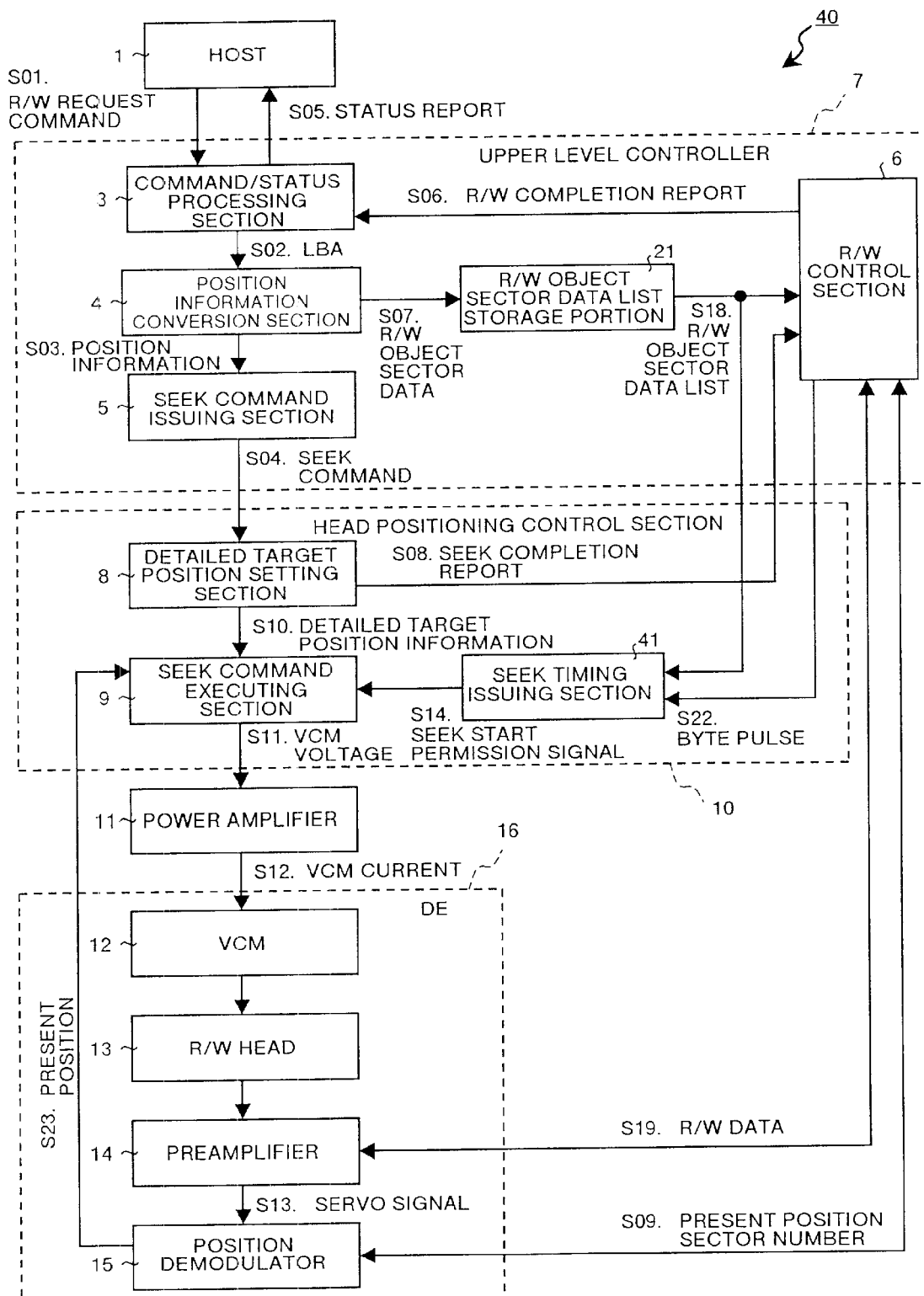
FIG. 11 is a block diagram showing a structure of a storage unit 40 according to a third embodiment of the present invention.

FIG. 11 is a block diagram showing a structure of a storage unit 40 according to a third embodiment of the present invention. In this Figure, the same reference numerals are provided to the sections corresponding to those in FIG. 1. In FIG. 11, a seek timing issuing section 41 is provided instead of the seek timing issuing section 22 shown in FIG. 1. The storage unit 40 of the third embodiment is the same as the storage unit 20 of the first embodiment in that the seek start permission signal S14 is outputted to the seek command executing section 9 when the count result of the counter becomes zero. The storage unit 40 of the third embodiment is so constructed that the count period is shorter as compared to the first embodiment so that the resolution is improved due to the decrease of the count period.

The aforementioned seek timing issuing section 41 keeps timing based on byte pulse S22 to be inputted from the read/write control section 6 and when a predetermined timing is reached, the seek start permission signal S14 is outputted to the seek command executing section 9. Here, the predetermined timing is the time $t_2$ shown in FIG. 13, which is the same as the timing of the time $t_2$ shown in FIG. 3. The aforementioned byte pulse S22 is a pulse to be outputted in an interval of every byte shown in FIG. 13. The interval of this 1 byte is smaller than an interval in which the sector pulse shown in FIG. 2 is outputted. The aforementioned 1 byte refers to 1 byte (8 bits) on a recording medium.

Figure 12:
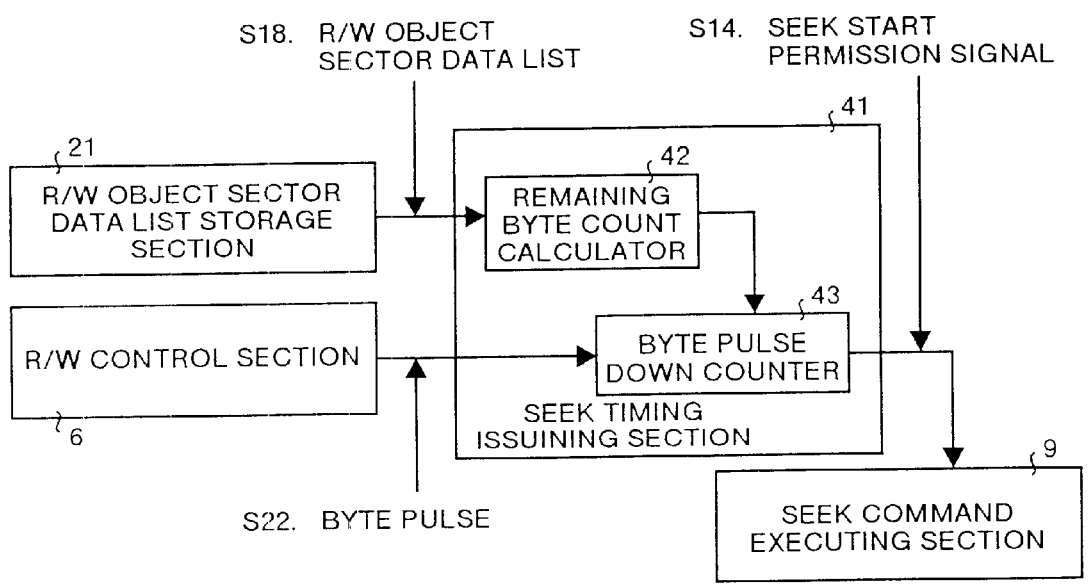
FIG. 12 is a block diagram showing a structure of the seek timing issuing section 41 shown in FIG. 11.

The seek timing issuing section 41 is provided with a remaining byte count calculator 42 and a byte pulse down counter 43 as shown in FIG. 12. The remaining byte count calculator 42 obtains a difference between a byte position in which the read/write head 13 is currently tracking and a byte position when the read/write operation ends as a seek start byte count from the read/write object sector data list S18. Further, the remaining byte count calculator 42 obtains a remaining byte count by subtracting a byte count corresponding to a time necessary for command processing and the like from this seek start byte count. This remaining byte count is set up as an initial value of the byte pulse down counter 43. The byte pulse down counter 43 is a down counter for counting down with respect to a count value set as the aforementioned initial value (remaining byte count) each time when the byte pulse S22 is inputted.

Figure 14:
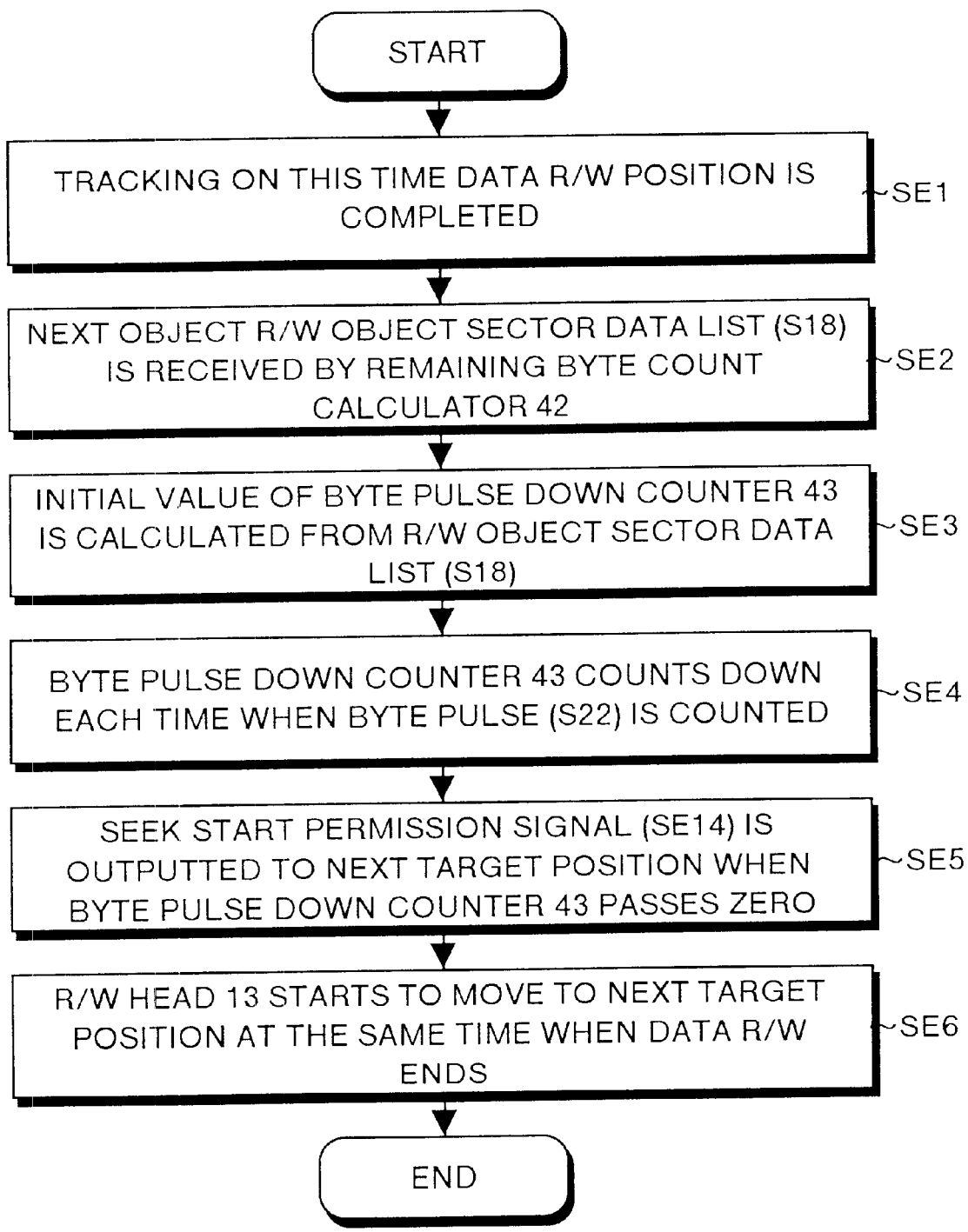
FIG. 14 is a flow chart for explaining an operation of the storage unit 40 according to the third embodiment of the present invention.
Figure 15:
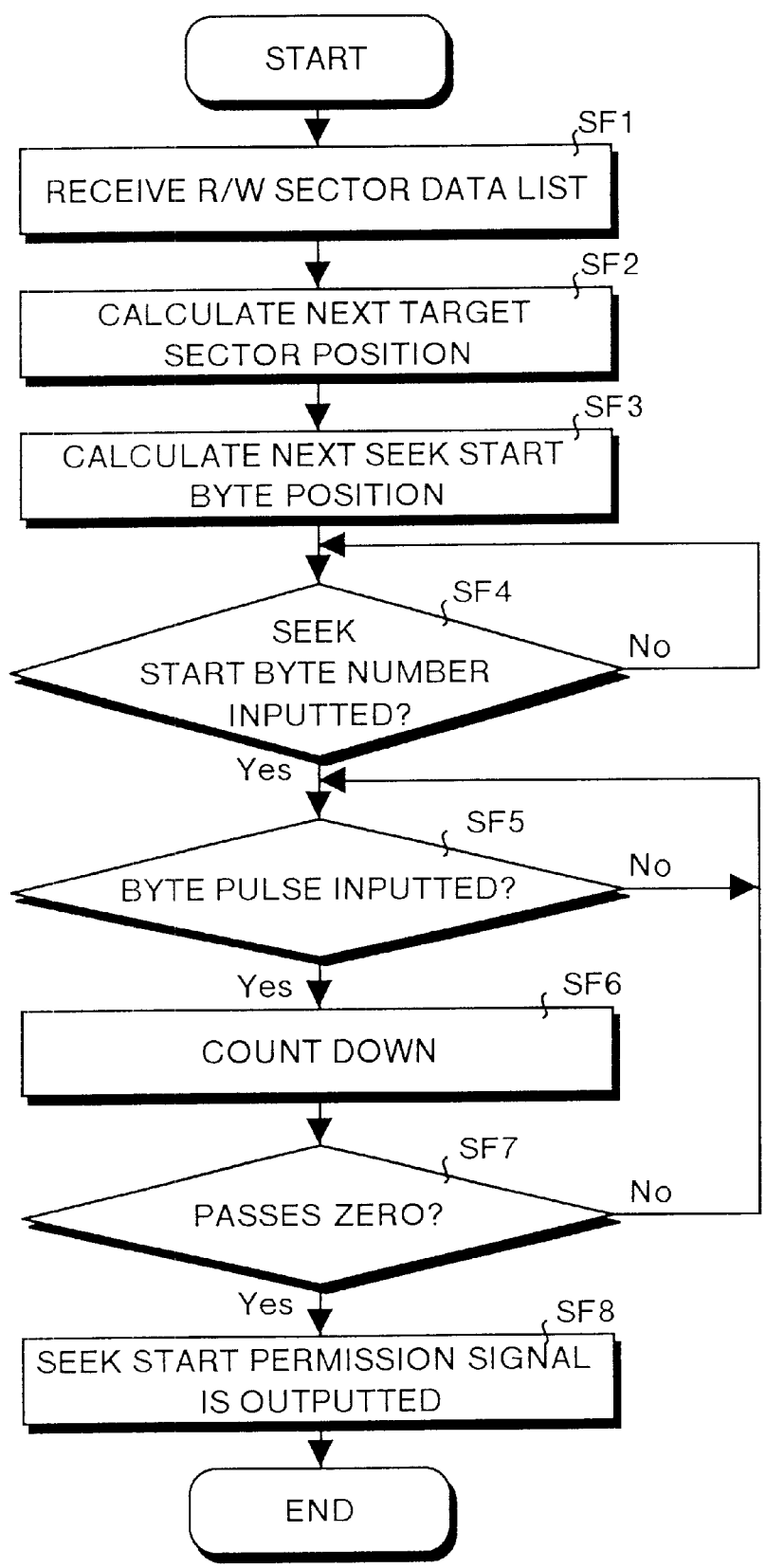
FIG. 15 is a flow chart for explaining an operation of the seek timing issuing section 41 shown in FIG. 11.

An operation of the storage unit 40 of the third embodiment will be described with reference to the flow charts shown in FIGS. 14 and 15. First of all, an outline of the entire operation will be described with reference to FIG. 14. In this case, it is assumed that the seek command executing section 9 has received the detailed target position information S10 and is in waiting condition. In step SE1 shown in FIG. 14, the read/write head 13 tracks a this time read/write position. In step SE2, the remaining byte count calculator 42 (in the seek timing issuing section 41) receives the read/write object sector data list S18 from the read/write object sector data list storage section 21.

Figure 13:
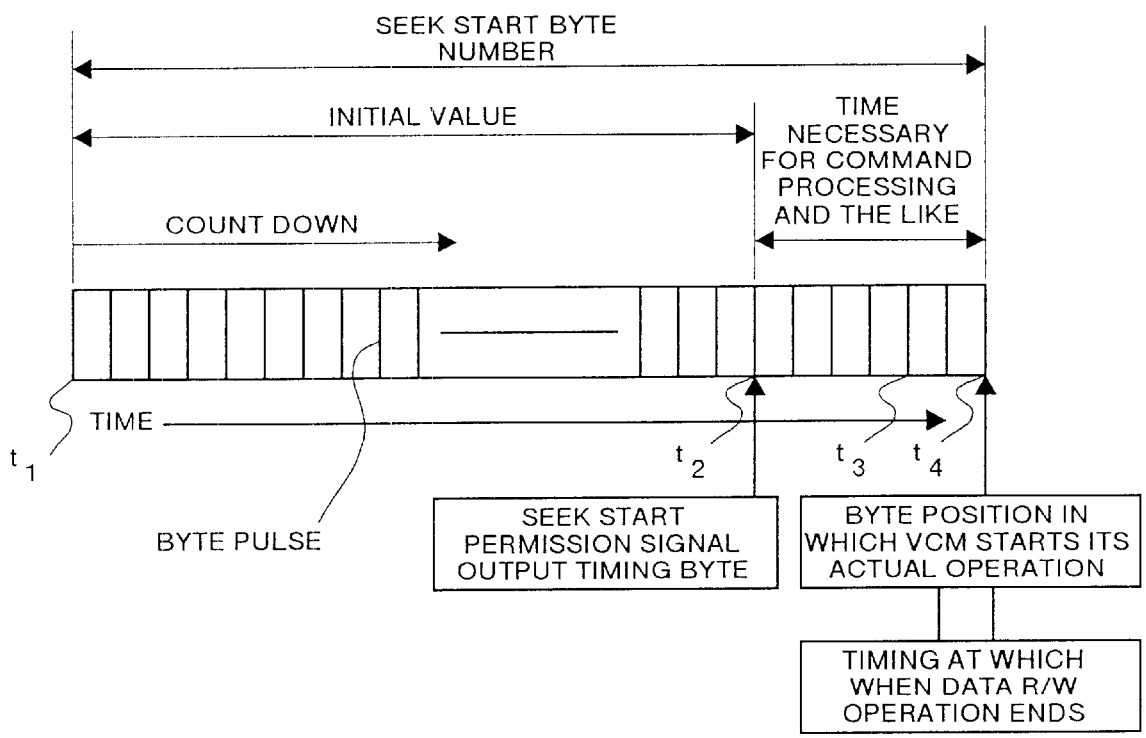
FIG. 13 is a diagram for explaining an operation of the storage unit 40 according to the third embodiment of the present invention.

In step SE3, the seek timing issuing section 41 obtains a difference between a byte position in which the read/write head 13 is currently tracking and a byte position when the read/write operation ends as a seek start byte count shown in FIG. 13 from the read/write object sector data list S18. After that, bytes corresponding to a time necessary for command processing and the like is subtracted from this seek start byte count so as to obtain an initial value of the byte pulse down counter 43.

In step SE4, during read/write operation, the byte pulse down counter 43 starts count-down of a count value according to the byte pulse S22 to be inputted each time when the read/write head 13 passes a byte position (time $t_1$ in FIG. 13). When the count value of the byte pulse down counter 43 becomes zero at time $t_2$ shown in FIG. 13, in step SE5, the seek timing issuing section 41 outputs the seek start permission signal S14 to the seek command executing section 9. As a result, the seek command executing section 9 outputs the VCM voltage S11 to the power amplifier 11 shown in FIG. 11 at time $t_3$ which is slightly earlier than the time $t_4$ shown in FIG. 13 after the command processing is carried out.

Here, a time interval from time $t_3$ to time $t_4$ shown in FIG. 13 is set up so as to compensate for prolongation of the seek time by inductance component of the VCM 12 in the same manner as the above described first embodiment. When the time $t_4$ shown in FIG. 13 is reached, in step SE6, at the same time when the read/write operation ends, the read/write head 13 is moved by the VCM 12 so as to start the seek operation. As a result, the read/write head 13 is moved toward a target position.

Next, an operation of the seek timing issuing section 41 shown in FIG. 12 will be described with reference to FIG. 15. In step SF1, the remaining byte count calculator 42 (in the seek timing issuing section 41) receives the read/write object sector data list S18. In step SF2, a next target sector position in the read/write head 13 is obtained based on the aforementioned read/write sector data list S18. In step SF3, the remaining byte count calculator 42 calculates a next seek start byte position or a byte position of the read/write head 13 when the present read/write operation ends, based on the calculation result in step SF2. Next, a difference between a byte position in which the read/write head 13 is currently tracking and the aforementioned byte position when the read/write operation ends is obtained as the seek start byte count (see FIG. 13).

In step SF4, whether or not the aforementioned seek start byte count (see FIG. 13) has been inputted is determined and if the result of this determination is "NO", then the same determination is repeated. If the result of this determination is "YES", then bytes corresponding to a time necessary for command processing or the like is subtracted from the seek start byte count shown in FIG. 13 and that result is set up in the byte pulse down counter 43 as an initial value. In step SF5, whether or not the byte pulse S22 is inputted to the byte pulse down counter 43 is determined and if the result of this determination is "NO", then the same determination is repeated.

When the byte pulse S22 is inputted, the result of determination in step SF5 becomes "YES". In step SF6, the byte pulse down counter 43 counts down the set initial value (see FIG. 13) and after that, the control proceeds to step SF7. In step SF7, whether or not the count value of the byte pulse down counter 43 passes zero is determined. When the result of this determination is "NO", the processing is returned to step SF5 and the above steps are repeated. At time $t_2$ shown in FIG. 13, the count value of the byte pulse down counter 43 becomes zero, so that the byte pulse down counter 43 determines the determination result in step SF7 to be "YES". As a result, in step SF7, the seek timing issuing section 41 outputs the seek start permission signal S14 to the seek command executing section 9. When the time $t_4$ shown in FIG. 13 is reached, the read/write operation ends like the above described operation, so that the seek operation of the read/write head 13 is started.

As described above, in the storage unit 40 of the third embodiment, when the count value of the byte pulse down counter 43 of the seek timing issuing section 41 becomes zero, a command is executed by the seek command executing section 9 and a timing when the aforementioned count value becomes zero is set up considering a delay in the command processing and the VCM 12, the seek operation can be started at the same time when the read/write operation ends. Thus, according to the storage unit 40 of the third embodiment like the storage unit 20 of the first embodiment, the data transmission efficiency is improved and the seek time is reduced.

In addition, according to the storage unit 40 of the third embodiment, by using the byte pulse S22, because the count period of the byte pulse down counter 43 becomes shorter as compared to the count period of the sector pulse down counter 23 in the storage unit 20 of the first embodiment, the resolution is improved.

Figure 16:
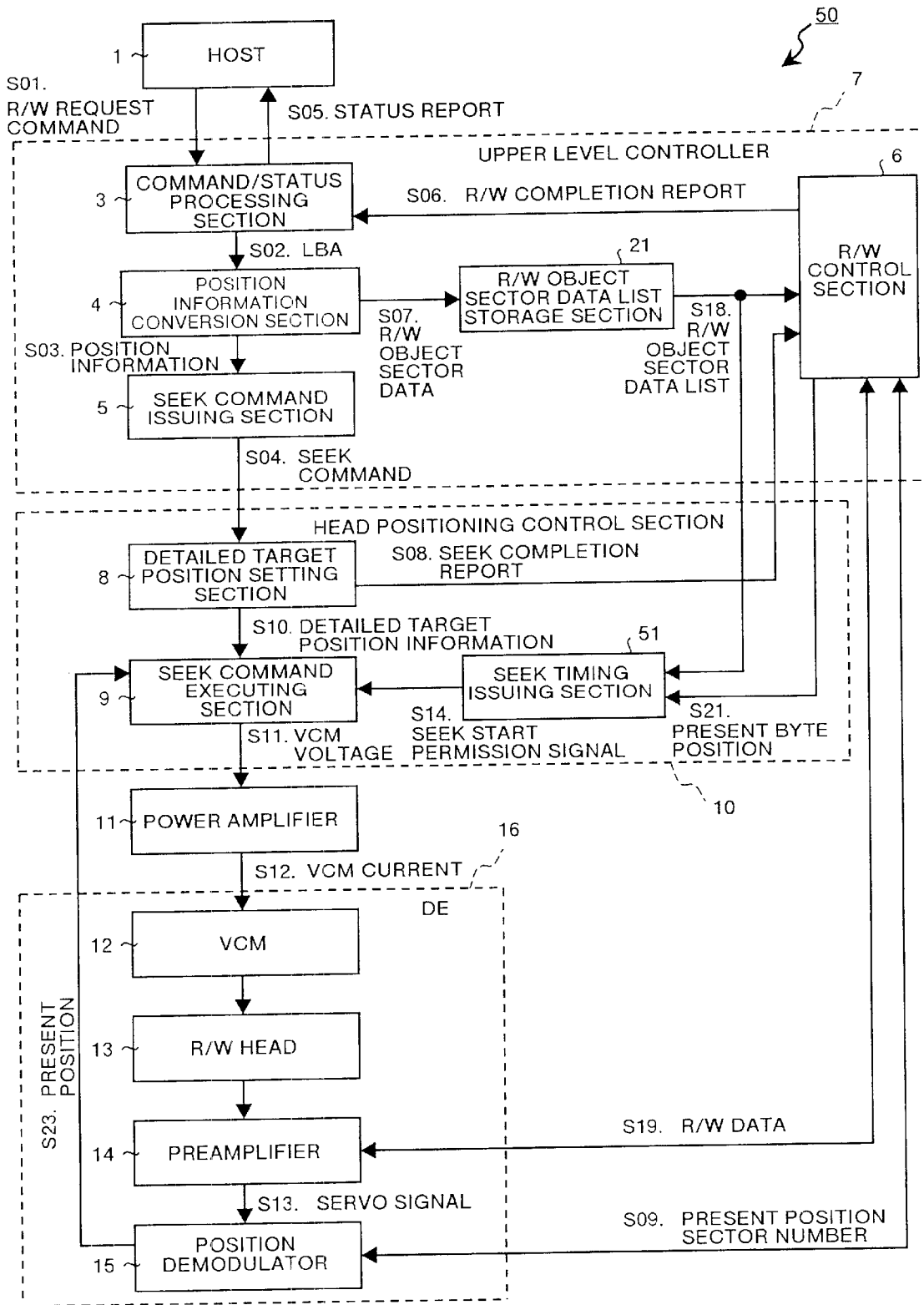
FIG. 16 is a block diagram showing a structure of a storage unit 50 according to a fourth embodiment of the present invention.

FIG. 16 is a block diagram showing a structure of a storage unit 50 according to the fourth embodiment of the present invention. Same reference numerals are provided to the sections corresponding to those in FIG. 6. Referring to FIG. 16, a seek timing issuing section 51 is provided instead of the seek timing issuing section 31 shown in FIG. 6. The storage unit 50 of the fourth embodiment is the same as the storage unit of the second embodiment in that the seek start permission signal S14 is outputted to the seek command executing section 9 when a present position of the read/write head 13 on the recording medium becomes a predetermined position.

However, the storage unit 50 of the fourth embodiment is different from the storage unit in the second embodiment in that the byte position is employed instead of the sector position as a position of the read/write head 13. The aforementioned byte position means a byte region smaller than each of the sector region on a recording medium. In other words, by using the byte position, the resolution can be improved as compared to a case where the sector position is used.

The seek timing issuing section 51 issues a timing for executing a seek command in the seek command executing section 9 based on the read/write object sector data list S18 and a present byte position S21. The seek start permission signal S14 is outputted to the seek command executing section 9. Here, the aforementioned present byte position S21 indicates a byte position of the read/write head 13 on the recording medium.

Figure 17:
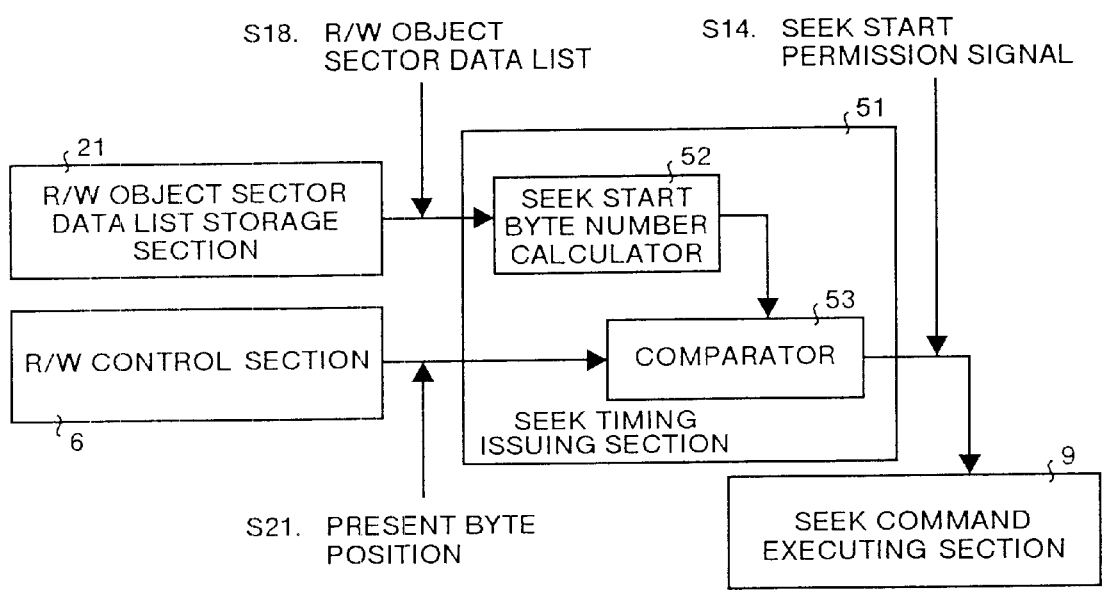
FIG. 17 is a block diagram showing a structure of the seek timing issuing section 51 shown in FIG. 16.

The seek timing issuing section 51 is provided with a seek start byte number calculator 52 and a comparator 53 as shown in FIG. 17. The seek start byte number calculator 52 obtains a position (number) of the seek start permission signal output timing byte shown in FIG. 18 from the read/write object sector data list S18. This seek start permission signal output timing byte is positioned to the left in the same figure by bytes corresponding to a time necessary for command processing and the like with respect to a byte in which the present read/write operation ends and determines a timing for outputting the seek start permission signal S14 to the seek command executing section 9. The comparator 53 compares a position (number) of a seek start permission signal output timing byte calculated by the seek start byte number calculator 52 with a present byte position (number) obtained from the present byte position S21.

Figure 19:
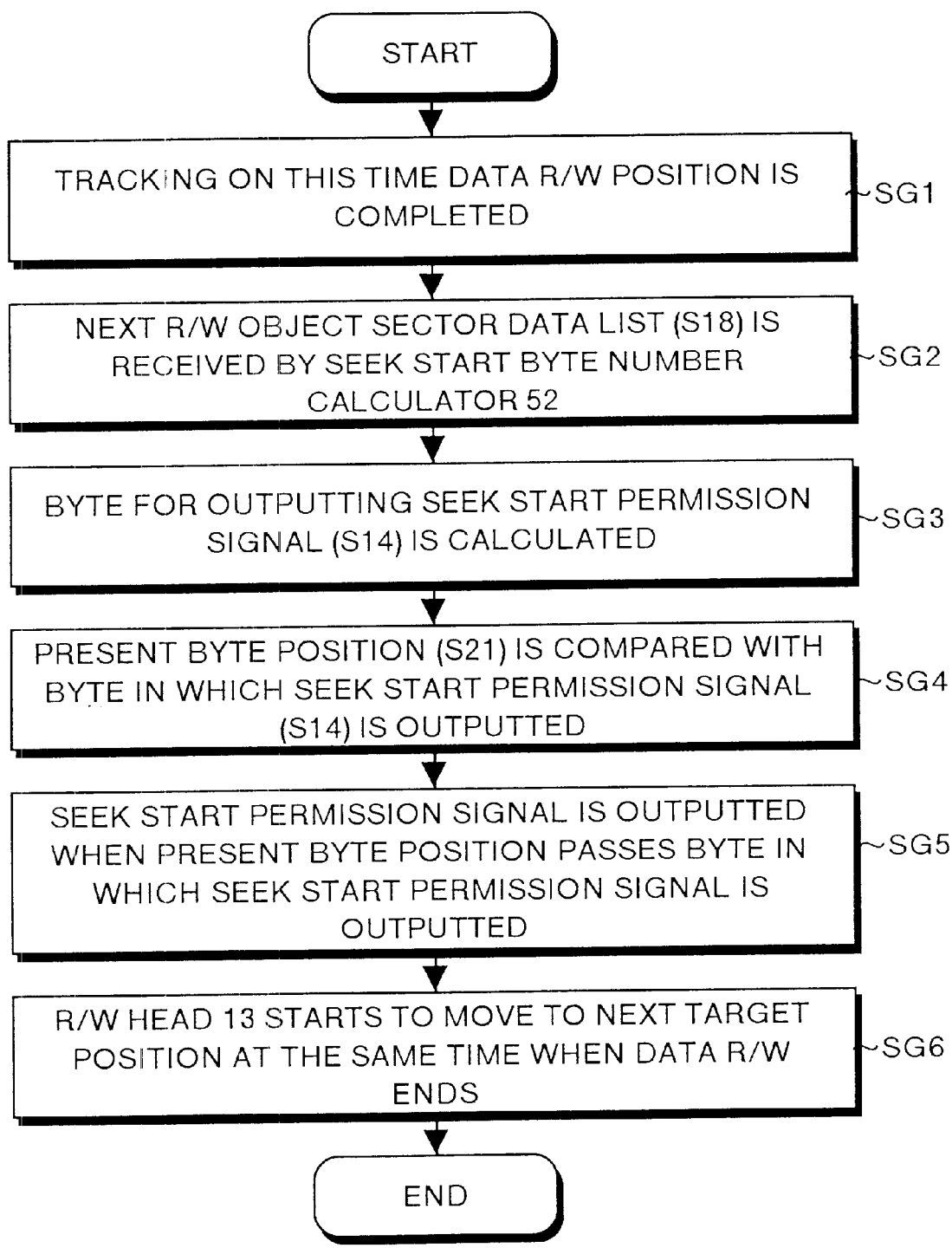
FIG. 19 is a flow chart for explaining an operation of the storage unit 50 according to the fourth embodiment of the present invention.
Figure 20:
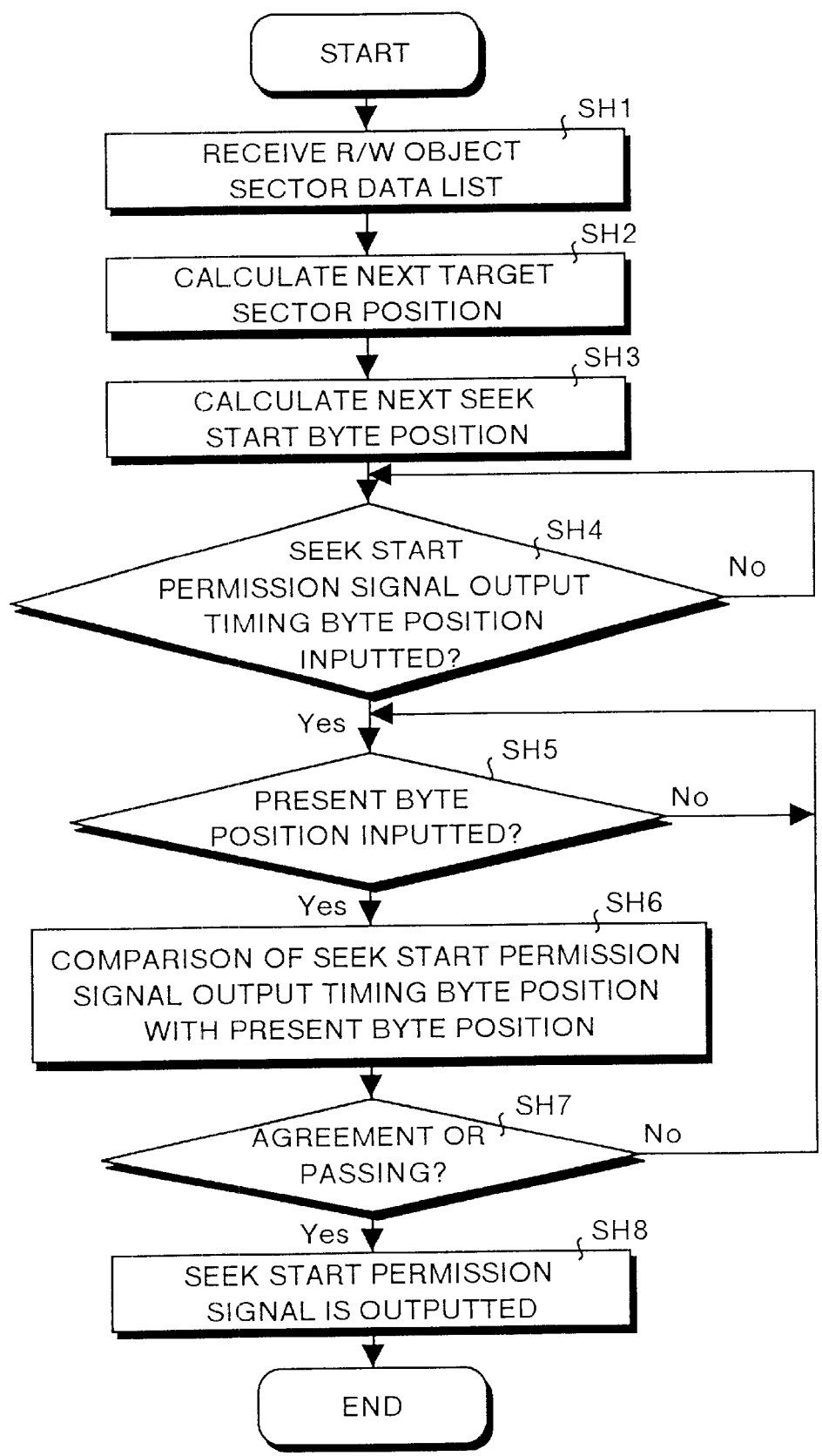
FIG. 20 is a flow chart for explaining an operation of the seek timing issuing section 51 shown in FIG. 16.

Next, an operation of the storage unit 50 according to the fourth embodiment will be described with reference to the flow charts of FIGS. 19, 20. First of all, an outline of its entire operation will be described with reference to FIG. 19. In this case, it is assumed that the seek command executing section 9 has already received the detailed target position information S10 and is in waiting condition. In step SG1 shown in FIG. 19, the read/write head 13 tracks a this time read/write position. In step SG2, the seek start byte number calculator 52 (seek timing issuing section 51) receives the read/write sector data list S18 from the read/write object sector data list storage section 21.

Figure 18:
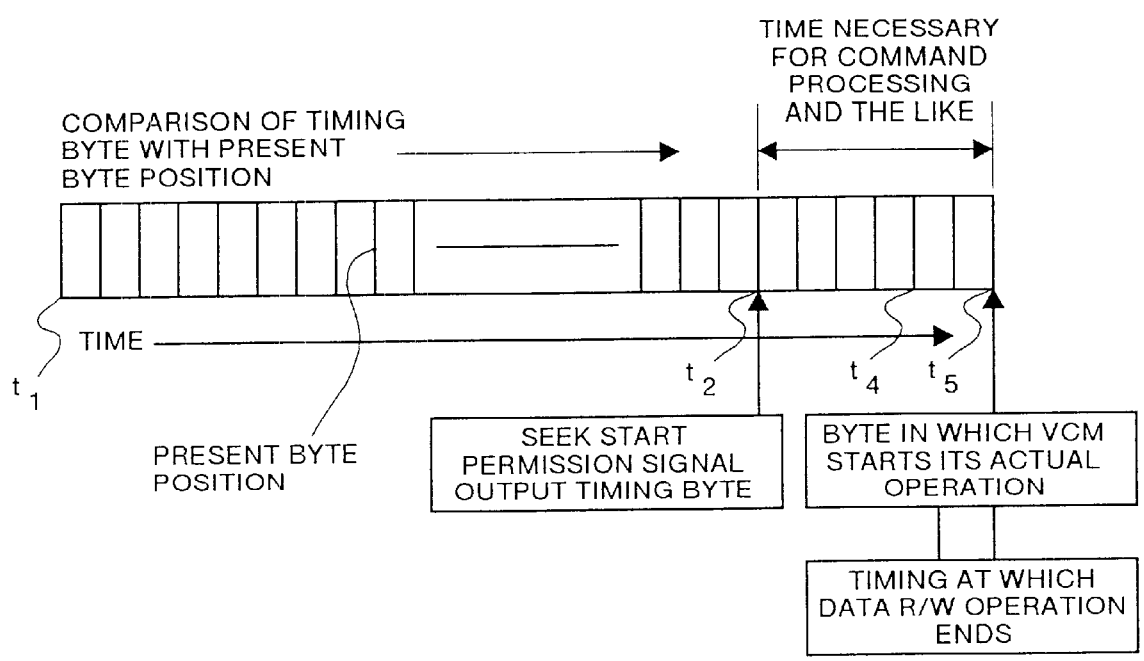
FIG. 18 is a diagram for explaining an operation of the storage unit 50 according to the fourth embodiment of the present invention.

In step SG3, the seek start byte number calculator 52 obtains a position (number) of the seek start permission signal output timing byte shown in FIG. 18 from the read/write object sector data list S18. Next, in step SG4, the comparator 53 compares a position (number) of the aforementioned seek start permission signal output timing byte with a present byte position (number) obtained from the present byte position S21. In step SG5, if the present byte position reaches the seek start permission signal output timing byte, the comparator 53 outputs the seek start permission signal S14 to the seek command executing section 9. As a result, the seek command executing section 9 outputs the VCM voltage S11 to the power amplifier 11 shown in FIG. 16 at time $t_4$ which is slightly earlier than the time $t_5$ shown in FIG. 18 after the command processing is carried out. When time $t_5$ shown in FIG. 18 is reached, in step SG6, at the same time when the read/write operation ends, the read/write head 13 is moved by the VCM 12 thereby the seek operation is started.

Next, an operation of the seek timing issuing section 51 shown in FIG. 17 will be described with reference to FIG. 20. In step SH1, the read/write object sector data list S18 is received by the seek start byte number calculator 52 (seek timing issuing section 51). In step SH2, a position of a next target sector (read/write termination sector) of the read/write head 13 is obtained based on the aforementioned read/write object sector data list S18. In step SH3, a seek start byte position is calculated based on an target sector obtained in step SH2. In step SH4, whether or not a seek start permission signal output timing byte position (see FIG. 18) is inputted is determined, and if the result of this determination is "NO", then the same determination is repeated.

When the seek start permission signal output timing position is inputted to the comparator 53, the determination result in step SH4 becomes "YES". In step SH5, the comparator 53 determines whether or not the present byte position S21 is inputted from the read/write control section 6 and if this determination result is "NO", then the same determination is repeated. When the present byte position S21 is inputted, the comparator 53 determines the determination result of step SH5 to be "YES" and the control proceeds to step SH6. In step SH6, the comparator 53 compares a present byte position obtained from the present byte position S21 with the seek start permission output signal timing byte position.

In step SH7, whether or not the comparison result of the comparator 53 is agreement (or passing) is determined, and if this determination result is "NO", the processing is returned to step SH5 and the above described steps are repeated. At time $t_2$ shown in FIG. 18, the present byte matches with the seek start permission output signal timing byte, so that the comparator 53 determines the determination result in step SH7 as "YES". Consequently, in step SH8, the seek timing issuing section 51 outputs the seek start permission signal S14 to the seek command executing section 9. When time $t_4$ shown in FIG. 18 is reached, the read/write operation ends like the above operation so as to start the seek operation of the read/write head 13.

As described above, in the storage unit 50 of the fourth embodiment, when the comparison result by the comparator 53 of the seek timing issuing section 51 is in agreement (or passing), the command is executed by the seek command executing section 9 and the seek start permission signal output timing byte is set up considering the command processing and a delay by the VCM 12. Thus, like the aforementioned second embodiment, the seek operation can be started at the same time when the read/write operation ends. Thus, according to the storage unit 50 of the fourth embodiment, the data transmission efficiency is improved and the seek time is reduced. Further, according to the storage unit 50 of the fourth embodiment, because the present byte position S21 is used, the sector division can be made finer as compared to a case where the present position sector number S09 is used as in the storage unit 20 of the first embodiment, the resolution is improved.

Figure 21:
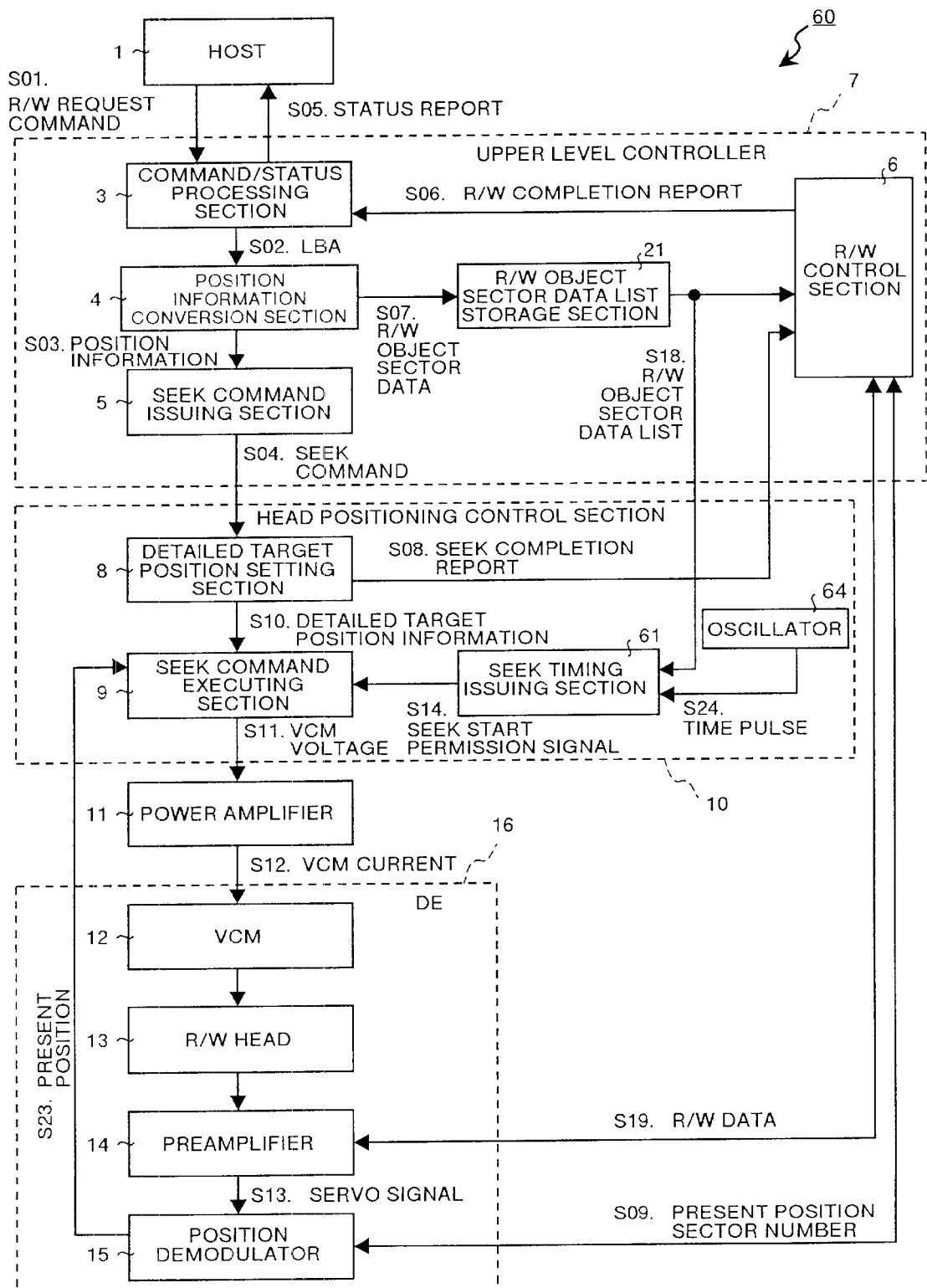
FIG. 21 is a block diagram showing a structure of a storage unit 60 according to a fifth embodiment of the present invention.

FIG. 21 is a block diagram showing a structure of a storage unit 60 according to a fifth embodiment of the present invention. Same reference numerals are provided to the sections corresponding to those in of FIG. 1. Referring to FIG. 21, a seek timing issuing section 61 and an oscillator 64 are provided instead of the seek timing issuing section 22 shown in FIG. 1. The storage unit 60 of the fifth embodiment is the same as the storage unit 20 of the first embodiment in that when a count result of the counter becomes zero, the seek start permission signal S14 is outputted to the seek command executing section 9. However, the storage unit 60 of the fifth embodiment is different from the storage unit 20 of the first embodiment in that in the storage unit 20 the count down is carried out using the sector pulse S16 (see FIG. 1) but the count down is carried out in the storage unit 60 by using the time pulse S24 from the asynchronous oscillator 64 which time pulse is non-synchronized with the rotation of the recording medium.

The aforementioned seek timing issuing section 61 issues a timing for carrying out a seek command in the seek command executing section 9 based on the read/write object sector data list S18 and time pulse S24 and outputs the seek start permission signal S14 to the seek command executing section 9. The oscillator 64 outputs the time pulse S24 asynchronous with the rotation of the recording medium to the seek timing issuing section 61 in a predetermined time interval.

Figure 22:
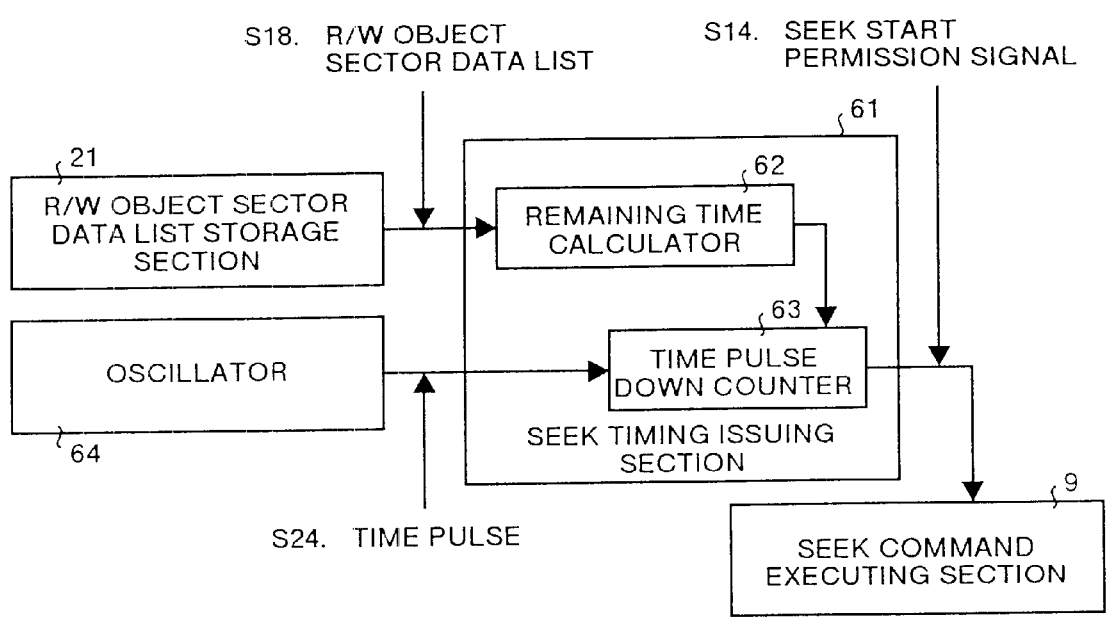
FIG. 22 is a block diagram showing a structure of the seek timing issuing section 61 shown in FIG. 21.
Figure 23:
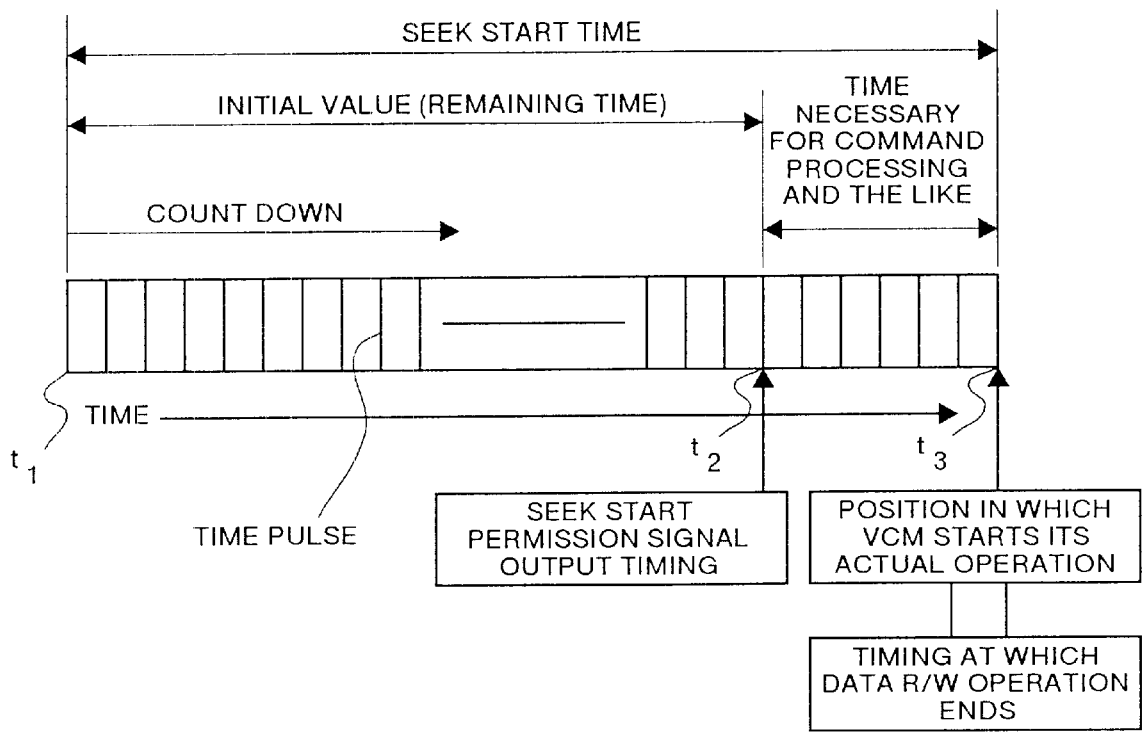
FIG. 23 is a diagram for explaining an operation of the storage unit 60 according to the fifth embodiment of the present invention.

The seek timing issuing section 61 is provided with a remaining time calculator 62 and a time pulse down counter 63 as shown in FIG. 22. As shown in FIG. 23, the aforementioned remaining time calculator 62 obtains a difference between time $t_1$ in which the present read/write head 13 tracks and time $t_2$ when the read/write operation ends as a seek start time according to the read/write object data list S18. Further, the remaining time calculator 62 obtains a remaining time as an initial value of the time pulse down counter 63 by subtracting a time necessary for command processing and the like from this seek start time. With a count value corresponding to the aforementioned remaining time as an initial value, the time pulse down counter 63 counts down the count value each time when the time pulse S24, is inputted.

Figure 24:
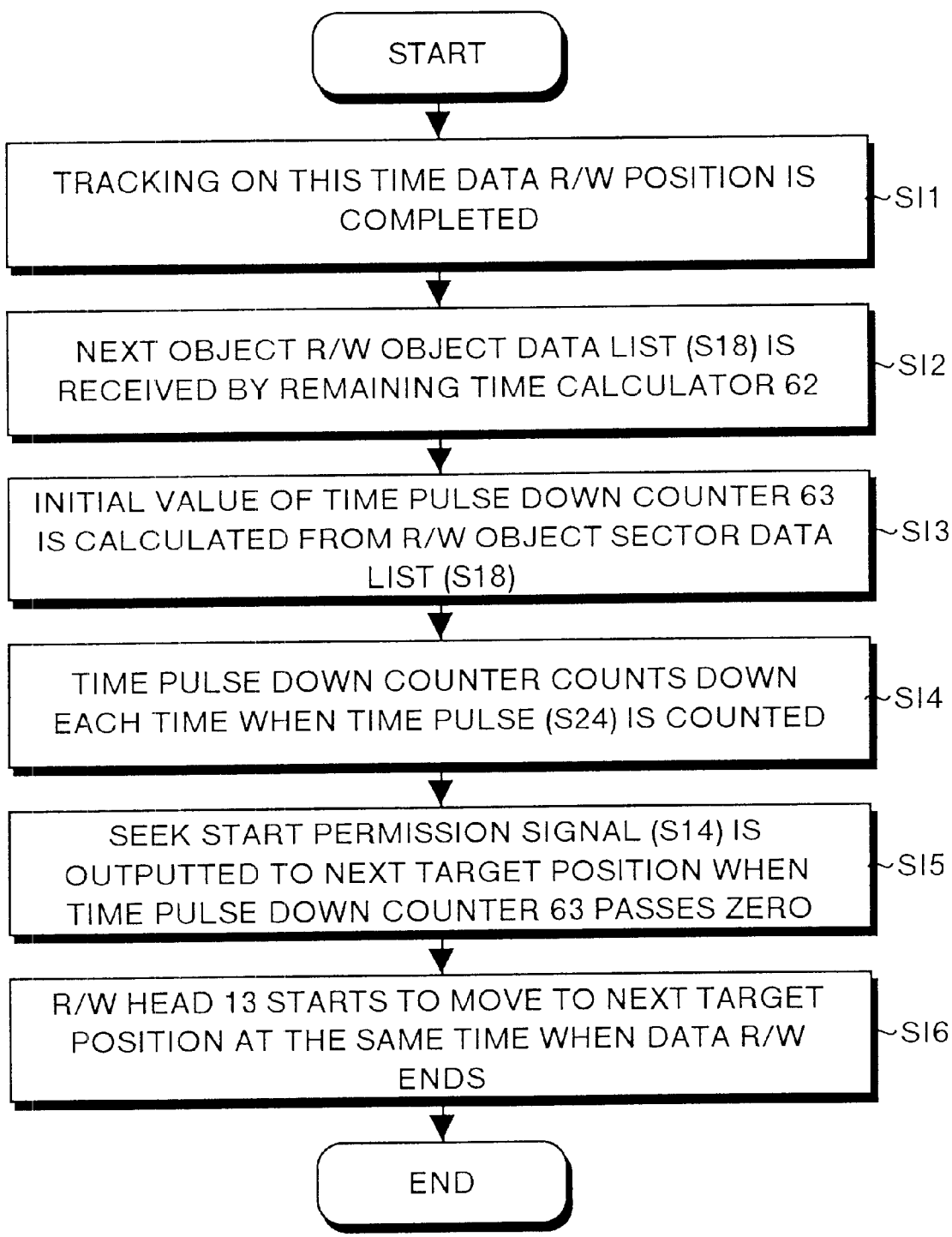
FIG. 24 is a flow chart for explaining an operation of the storage unit 60 according to the fifth embodiment of the present invention.
Figure 25:
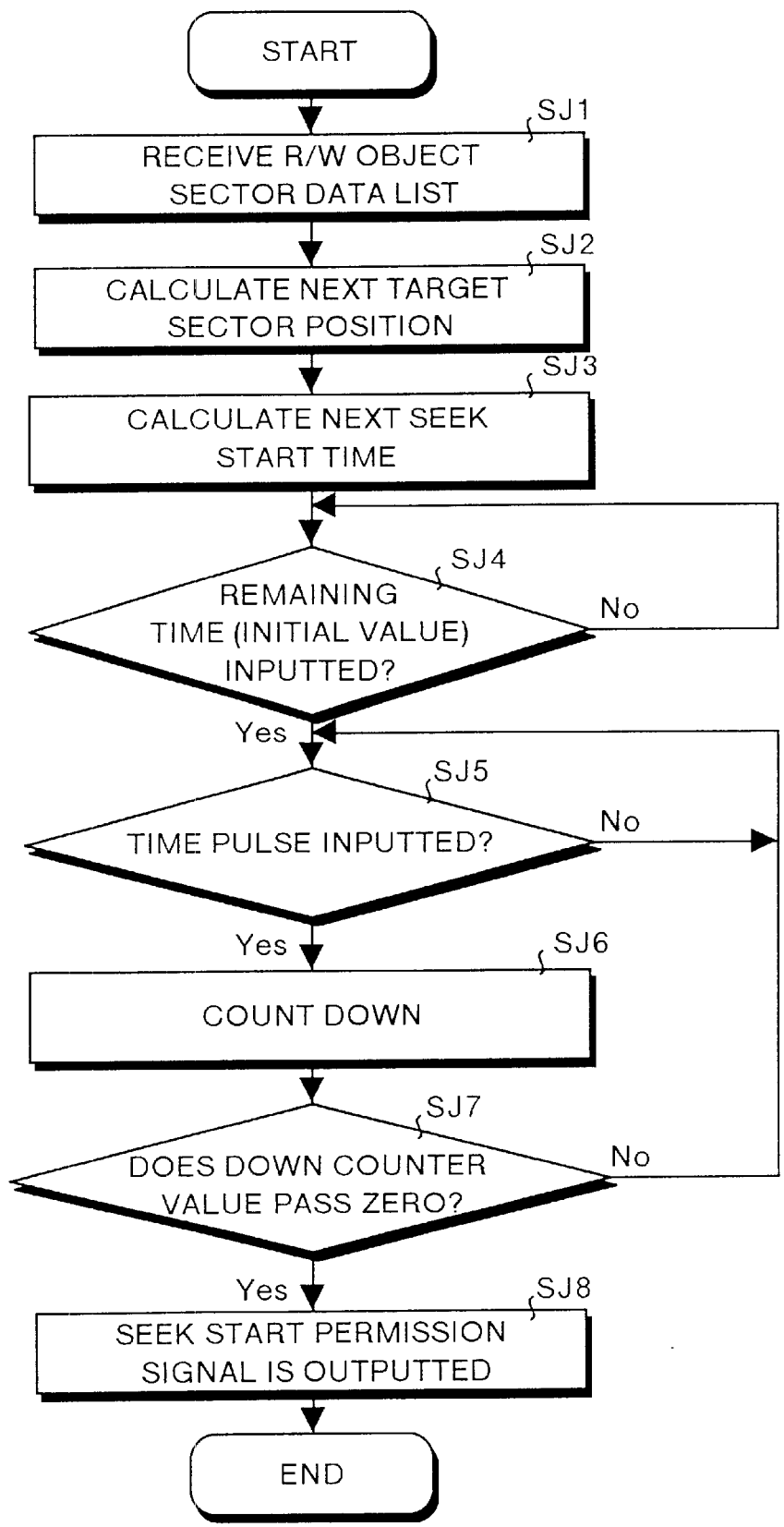
FIG. 25 is a flow chart for explaining an operation of the seek timing issuing section 61 shown in FIG. 21.

Next, an operation of the storage unit 60 according to the fifth embodiment will be described with reference to the flow charts of FIGS. 24, 25. First of all, an outline of its entire operation will be described with reference to FIG. 24. In this case, it is assumed that the seek command executing section 9 has already received the detailed target position information S10 and is in waiting condition. In step SI1, the read/write head 13 tracks a this time read/write position. In step SI2, the remaining time calculator 62 (in the seek timing issuing section 61) receives a read/write object sector data list S18 from the read/write object sector data list storage section 21.

Then, in step SI3, the remaining time calculator 62 obtains a seek start time shown in FIG. 23 and after that, obtains an initial value (remaining time) by the above computation so as to set up a count value corresponding to this initial value in the time pulse down counter 63. In step SI4, the time pulse S24 is inputted to the time pulse down counter 63 from the oscillator 64, and the time pulse down counter 63 counts down the count value (time $t_1$ in FIG. 23). When the count value of the time pulse down counter 63 becomes zero at time $t_2$ shown in FIG. 23, in step SI5, the seek timing issuing section 61 outputs the seek start permission signal S14 to the seek command executing section 9.

As a result, the seek command executing section 9 outputs the VCM voltage S11 to the power amplifier 11 shown in FIG. 21 at a time slightly earlier than the time $t_3$ shown in FIG. 23 after the command processing is carried out. Here, the time $t_2$–$t_3$ shown in FIG. 23 is a time until a steady condition is established after the VCM current S12 is inputted to the VCM 12 or a time necessary for command processing and the like. At the time $t_3$ shown in FIG. 23, in step SI6, the read/write operation ends and simultaneously the read/write head 13 is moved by the VCM 12, thereby the seek operation being started. As a result, the read/write head 13 is moved toward a next target position.

Next, an operation of the seek timing issuing section 61 shown in FIG. 22 will be described with reference to FIG. 25. In step SJ1, the read/write object sector data list S18 is received by the remaining time calculator 62 (in the seek timing issuing section 61) and in step SJ2, a next target sector for the read/write head 13 is obtained based on the aforementioned read/write sector data list S18. In step SJ3, a next seek start time shown in FIG. 22 is calculated and a remaining time (initial value) is calculated by subtracting a time necessary for command processing and the like from this seek start time.

In step SJ4, whether or not the aforementioned remaining time (initial value) is inputted is determined and if this determination result is "NO", then the same determination is repeated. When a count value corresponding to the remaining time is set up in the time pulse down counter 63, the determination result in step SJ4 becomes "YES". Next, in step SJ5, whether or not the time pulse S24 is inputted to the time pulse down counter 63 is determined and if this determination result is "NO", then the same determination is repeated. If the determination result is "YES", in step SJ6, the time pulse down counter 63 counts down from a set initial value (see FIG. 23) and the processing proceeds to step SJ7.

In step SJ7, whether or not the count value of the time pulse down counter 63 passes zero is determined, and if this determination result is "NO", then the control is returned to step SJ5 and the above steps are repeated. When the count value of the time pulse down counter 63 becomes zero at time $t_2$ shown in FIG. 23, the time pulse down counter 63 determines the determination result in step SJ7 to be "YES". As a result, in step SJ8, the seek timing issuing section 61 outputs the seek start permission signal S14 to the seek command executing section 9. At time $t_3$ shown in FIG. 23, the read/write operation ends as explained above, so that the seek operation of the read/write head 13 is started.

As described above, according to the storage unit 60 of the fifth embodiment, when the count value in the time pulse down counter 63 of the seek timing issuing section 61 becomes zero, the command is executed by the seek command executing section 9 and a timing at which the aforementioned count value becomes zero is set up considering a delay in the command processing and VCM 12 so that the seek operation can be started at the same time when the read/write operation ends. Thus, according to the storage unit 60 of the fifth embodiment, the data transmission efficiency is improved and the seek time is reduced. Further, according to the storage 60 of the fifth embodiment, because the count down is carried out in the time pulse down counter 63 using the time pulse S24 that is asynchronous with the rotation of the recording medium, the seek operation can be achieved at a fine precision without being affected by a deflection of the rotation of the recording medium.

Figure 26:
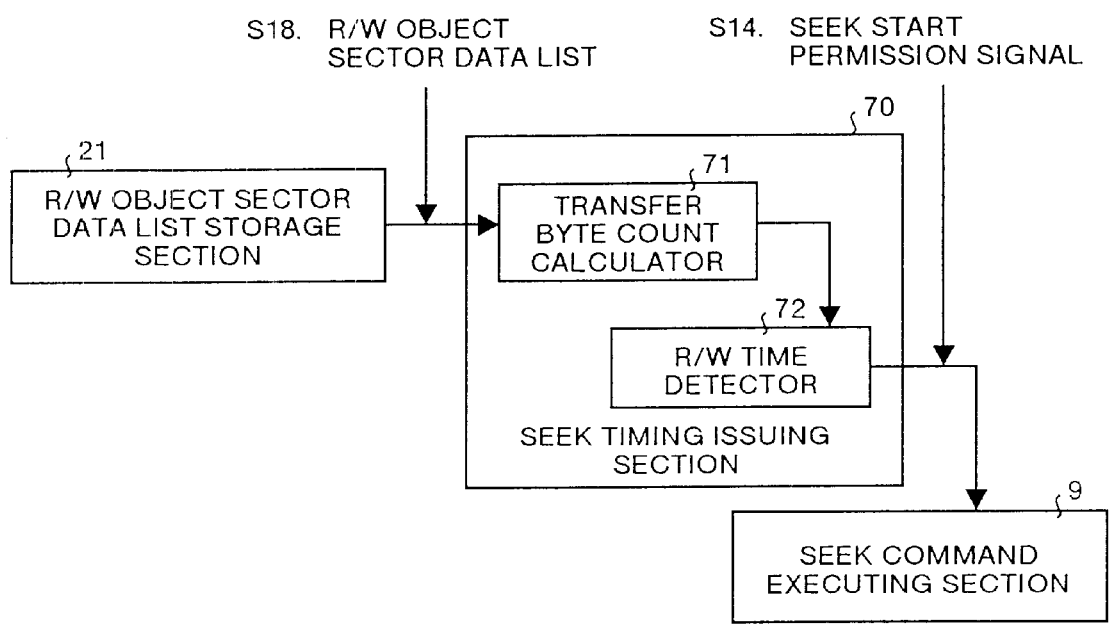
FIG. 26 is a block diagram showing a structure of a seek timing issuing section 70 in the storage unit according to a sixth embodiment of the present invention.

FIG. 26 is a block diagram showing a structure of a seek timing issuing section 70 in a storage unit according to the sixth embodiment of the present invention. Same reference numerals are provided to the sections corresponding to those in FIG. 22. The seek timing issuing section 70 shown in this figure outputs the seek start permission signal S14 to the seek command executing section 9 at a timing in which the seek operation is carried out at the same time when the read/write operation ends, like the seek timing issuing section 61 (see FIG. 22). In the seek timing issuing section 70, transferred byte count is used to determine the aforementioned timing.

In this seek timing issuing section 70, a transferred byte count calculator 71 calculates a transferred byte count at the time of the read/write operation according to the read/write object sector data list S18 to be inputted from the read/write object sector data list storage 21. A read/write time detector 72 obtains a result of dividing the aforementioned transferred byte count by a data transfer speed set preliminarily as a time necessary for the read/write operation. Further, the read/write time detector 72 is provided with a timer function and when a time count of the time passes a time necessary for the read/write operation, the seek start permission signal S14 is outputted to the seek command executing section 9. A timing in which the seek start permission signal S14 is outputted is time $t_3$ shown in FIG. 23. However, the above timing may be time $t_2$ shown in FIG. 23 by such a correction by subtracting a time necessary for the command processing and the like from a time necessary for the read/write operation.

Figure 27:
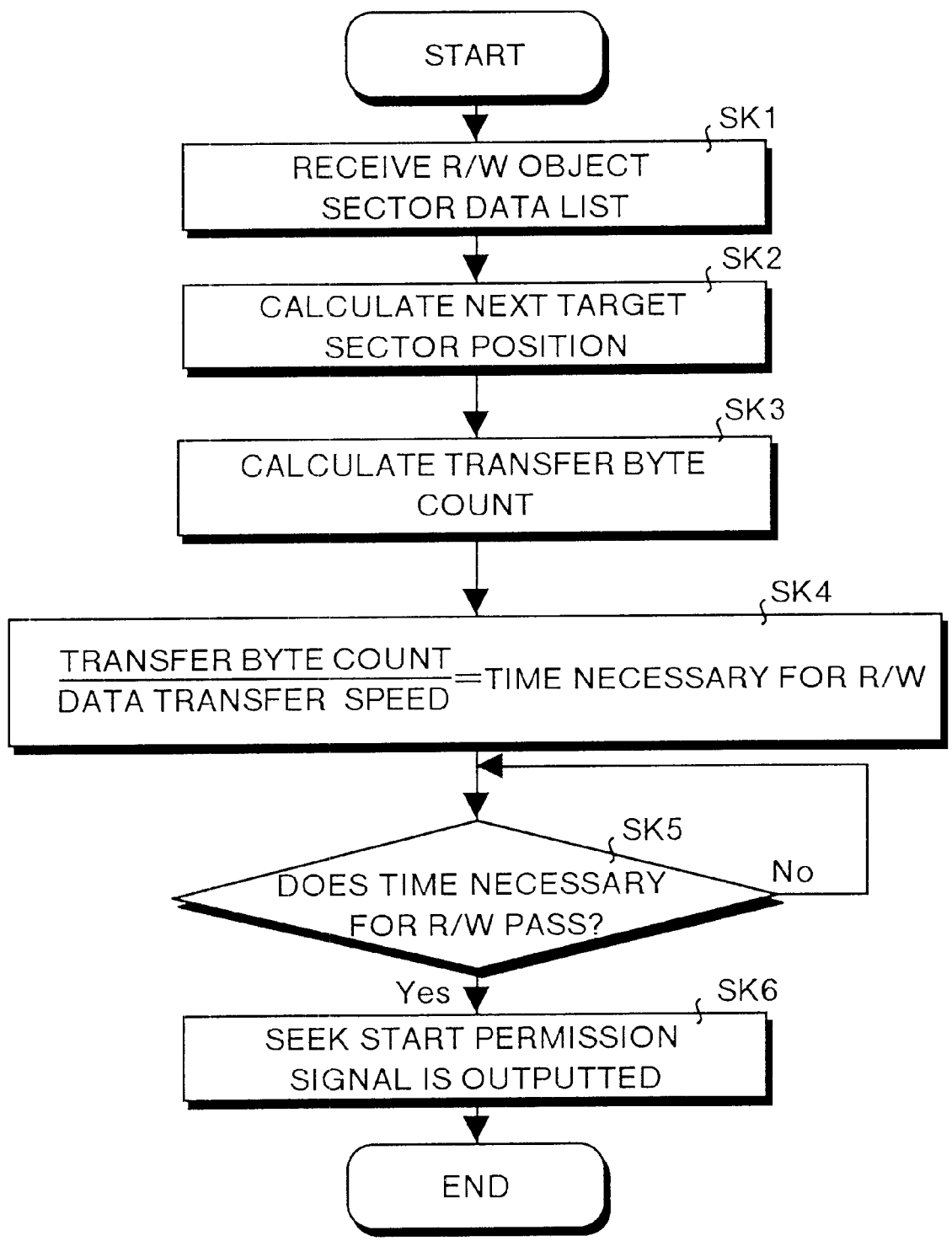
FIG. 27 is a flow chart for explaining an operation of the seek timing issuing section 70 shown in FIG. 26.

Next, an operation of the above-mentioned seek timing issuing section 70 will be described with reference to a flow chart shown in FIG. 27. In step SK1, the read/write object sector data list S18 is received by the transferred byte count calculator 71 of the seek timing issuing section 70. In step SK2, a next target sector for the read/write head 13 is obtained based on the aforementioned read/write object sector data list S18. In step SK3, the transferred byte count calculator 71 obtains a transferred byte count in the read/write operation and after that, outputs this calculation result to the read/write time detector 72. As a result, in step SK4, the read/write time detector 72 obtains a time necessary for the read/write operation by dividing the transferred byte count by the data transfer speed. Then, the read/write time detector 72 starts counting a time with a timer and determines whether or not this counting result exceeds a time necessary for the above read/write operation.

If the aforementioned read/write operation needs to be corrected by a time necessary for the command processing shown in FIG. 23 and the like, when the time $t_2$ is reached, the counting result of the timer exceeds a time necessary for the read/write operation. Therefore, the read/write time detector 72 determines the determination result of step SK5 to be "YES" and the control proceeds to step SK6. In step SK6, the seek timing issuing section 70 outputs the seek start permission signal S14 to the seek command executing section 9. Consequently, at the same time when the read/write operation ends at time $t_3$ shown in FIG. 23 like the previously described operation, the seek operation is started.

According to the storage unit of the sixth embodiment, as described above, a time necessary for the read/write operation is preliminarily obtained and then when the counting result of the timer passes the same time, the command is executed by the seek command executing section 9. Therefore, at the same time when the read/write operation ends, the seek operation can be started. Consequently, the data transmission efficiency is improved and the seek time is reduced.

Figure 28:
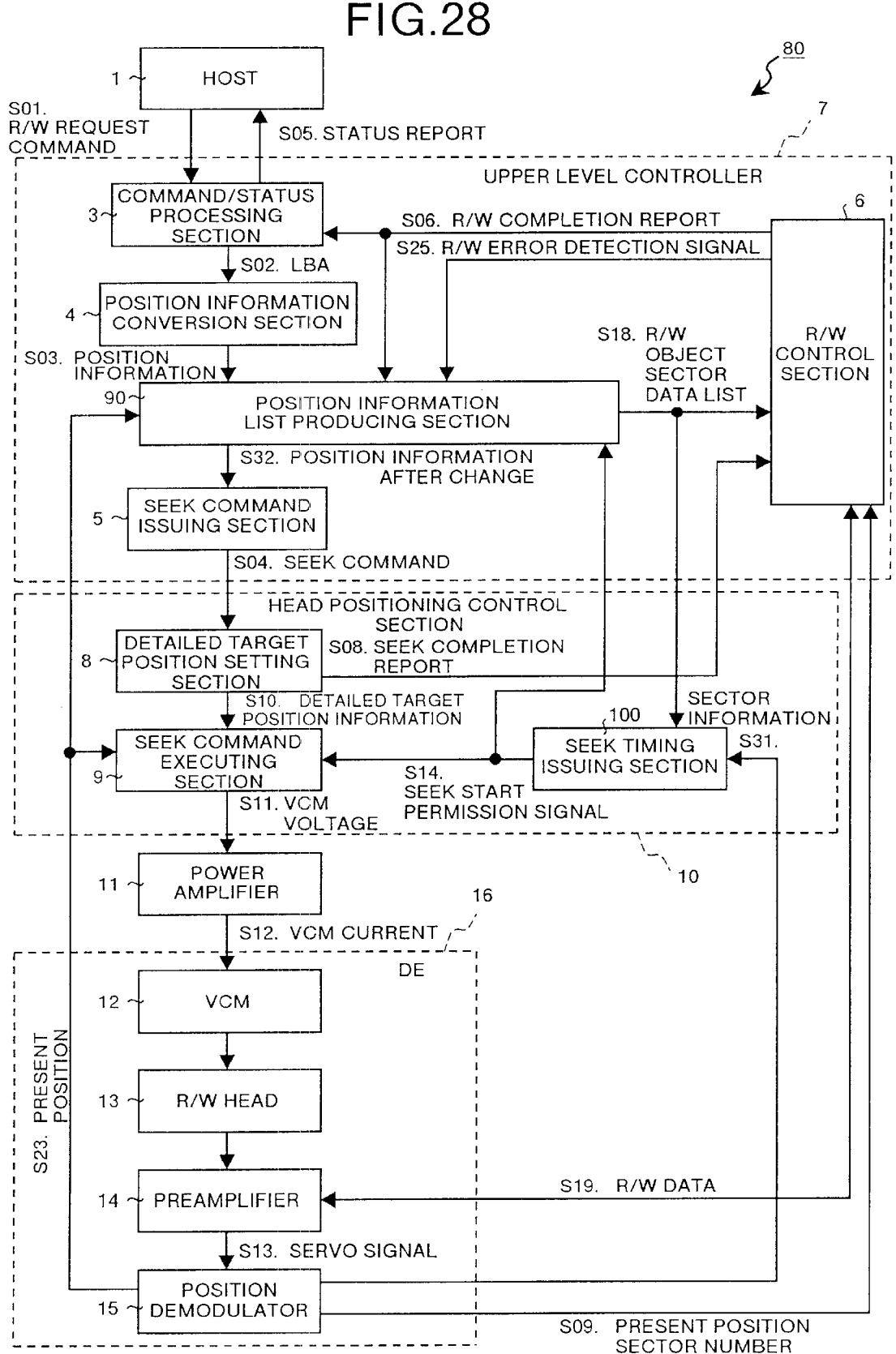
FIG. 28 is a block diagram showing a structure of a storage unit 80 according to a seventh embodiment of the present invention.

FIG. 28 is a block diagram showing a structure of a storage unit 80 according to a seventh embodiment of the present invention. Same reference numerals are provided to the sections corresponding to those in FIG. 1. A position information list producing section 90 and a seek timing issuing section 100 are provided instead of the read/write object sector data list storage section 21 and seek timing issuing section 22 shown in FIG. 1.

Here, if seek completion report S08 is not inputted over a predetermined time or no read/write data S19 (read data) is inputted over a predetermined time, the read/write control section 6 detects that an error has occurred in the read (or write) operation and this detection result is outputted to the position information list producing section 90 as the read/write detection signal S25. Here, the read/write error detection signal S25 means a read error or a write error.

The position information list producing section 90 produces a position information list with the position information S03 inputted in succession from the position information conversion section 4 (see FIG. 28) and holds it in a not shown storage section. Further, the position information list producing section 90 outputs a position information which is located at a head of the position information list to the read/write control section 6 as the read/write object sector data list S18. The position information list producing section 90 deletes the position information located at the head from the position information list each time when it receives the read/write completion report S06 from the read/write control section 6. Here, the position information list is a list produced by considering a sequence of the seek operation so as to enable the read/write operation in the shortest time.

If a read/write error detection signal S25 is inputted from the read/write control section 6 during the read/write operation or a read/write error occurs, the position information list producing section 90 initializes the position information list and after that, rearranges a sequence of the position information in the position information list or a sequence of the seek operation considering the present position S23 of the read/write head 13. The reason why this rearrangement is carried out is that when the read/write error occurs, the present position of the read/write head 13 may be different from an initially expected present position and in this case, even if the seek operation is carried out following the initial position information list, the read/write operation is not always performed in the shortest time. If the position information in the position information list is rearranged, the position information list producing section 90 outputs it to the seek command issuing section 5 as the position information S32 after the head position information is changed.

As a seek timing issuing section 100, any one of the seek timing issuing section 22 (see FIG. 1), seek timing issuing section 31 (see FIG. 6), seek timing issuing section 41 (see FIG. 11), seek timing issuing section 51 (see FIG. 16), seek timing issuing section 61 (see FIG. 21) and seek timing issuing section 70 (see FIG. 26), described with respect to the storage units according to the first to sixth embodiments may be employed. Therefore, in the storage unit 80 of the seventh embodiment, at the same time when the read/write operation ends, the seek operation is carried out.

With the above structure, if the position information S03 is inputted from the position information conversion section 4 to the position information list producing section 90 in succession, the position information list producing section 90 produces a position information list from the position information S03 considering the shortest time of the read/write operation. Next, the position information list producing section 90 outputs the read/write object sector data list S18 generated from the head position information in the position information list to the read/write control section 6 and outputs the position information after change S32 to the seek command issuing section 5. In this case, it is assumed that the position information list is not rearranged.

After that, the seek operation of the read/write head 13 and read/write operation are carried out in the same manner as explained above. Here, assuming that a read/write error occurs during the read/write operation, the read/write control section 6 outputs the read/write error detection signal S25 to the position information list producing section 90. As a result, the position information list producing section 90 initializes the position information list and then rearranges the sequence of the position information in the position information list, that is, the sequence of the seek operation considering the present position S23 of the read/write head 13. After that, based on a head position information in this rearranged position information list, the position information after change S32 and the read/write object sector data list S18 are outputted to the seek command issuing section 5 and read/write control section 6, so that the seek operation and read/write operation are carried out after the read/write error occurs.

As described above, because in the storage unit 80 of the seventh embodiment, in addition to the effects of the first to sixth embodiments, the position information in the position information list is rearranged considering this read/write error when a read/write error occurs, the read/write operation can be carried out in the shortest time.

In the storage unit 80 of the seventh embodiment, when the read/write error detection signal S25 (read error detection signal in this case) is inputted to the position information list producing section 90, it is permissible to so construct that the position information in the position information list is rearranged such that a position information corresponding to this read error detection signal is located at the head of the position information with precedence. Specifically, if the read error detection signal is inputted, after the position information list is initialized, the position information list producing section 90 rearranges the position information in the position information list such that the position information corresponding to the read error detection signal is located at the head with precedence. This rearrangement is carried out each time when the read error signal is inputted. Therefore, in this case, by retrying for reading operation to a sector on the recording medium in which a read error occurs, the read data can be obtained more securely.

In the storage unit 80 of the seventh embodiment, the example for eliminating an occurrence of the read error by the rearrangement has been described. Alternatively, it is permissible to preliminarily simulate in the case of the occurrence of the read error and preliminarily store a plurality of the read/write object sector data lists S18 (position information list) after the rearrangement in a position information list producing section 90 as a table. In this case, if a read error occurs, a read/write object sector data list S18 is selected from the above table so that the read/write operation is carried out based thereon. In other words, by preparing the table, a necessity of the rearrangement processing is eliminated.

Figure 29:
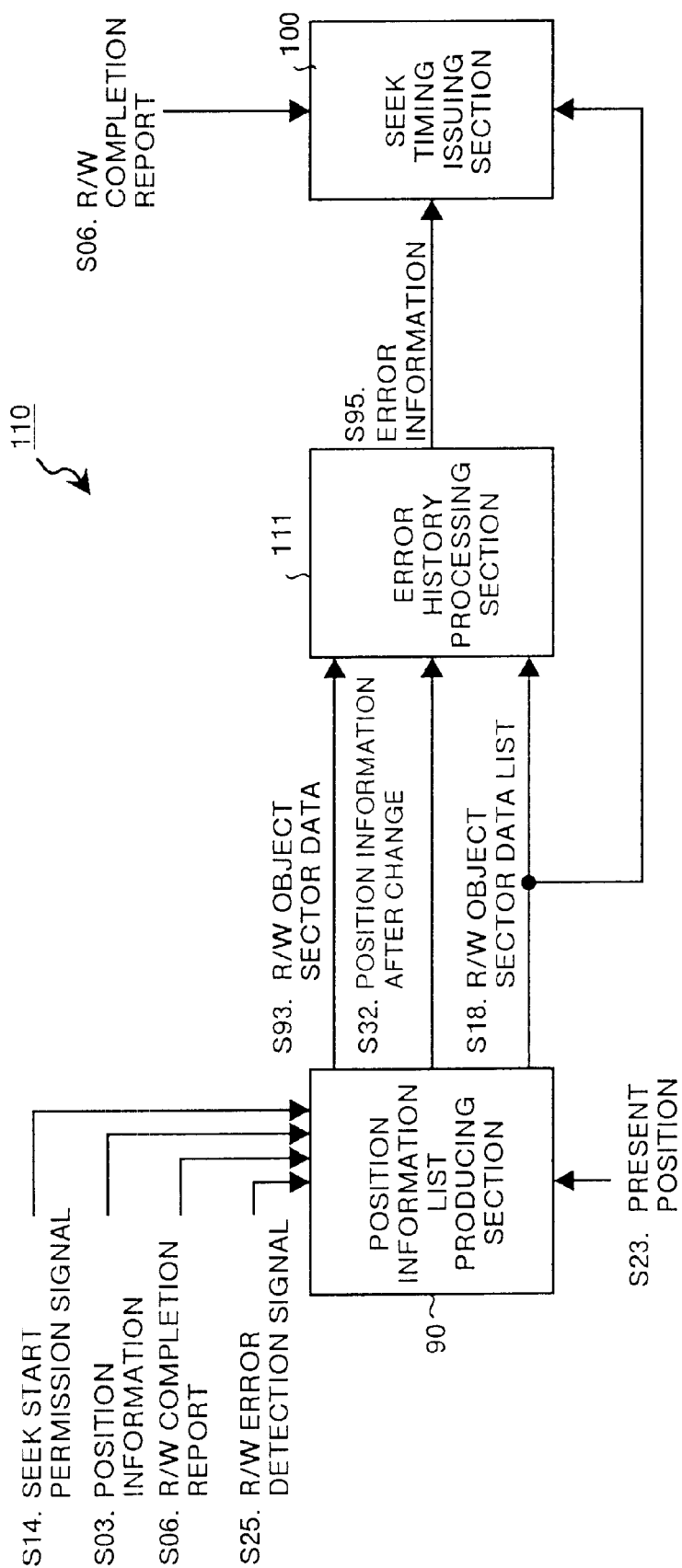
FIG. 29 is a block diagram showing a structure of major parts of the storage unit 110 according to an eighth embodiment of the present invention.

FIG. 29 is a block diagram showing a structure of a storage unit 110 according to an eighth embodiment of the present invention. Same reference numerals are provided to the sections corresponding to those in FIG. 28. In this Figure, an error history processing section 111 is interposed between the position information list producing section 90 and the seek timing issuing section 100 (see FIG. 28).

Although an operation (position information list rearrangement operation) of the position information list producing section 90 in this eighth embodiment is the same as that of the position information list producing section 90 (see FIG. 28) of the above-described seventh embodiment, when the read/write error detection signal S25 is inputted, the read/write object sector data S93 about a sector in which the read/write error exits is outputted to the error history processing section 111. Further, the position information list producing section 90 outputs the position information after change S32 and the read/write object sector data list S18 to the error history processing section 111 in addition to the seek command issuing section 5 and the read/write control section 6 shown in FIG. 28. When the read/write completion report S06 is inputted from the read/write control section 6 (see FIG. 28), the position information list producing section 90 outputs the read/write object sector data S93 about a sector in which the read/write error exits to the error history processing section 111.

When the read/write error detection signal S25 is inputted to the position information list producing section 90, the error history processing section 111 holds error history about a sector in which a read/write error exits. Each time when the position information after change S32 and the read/write object sector data list S18 are inputted, the error history processing section 111 compares an object sector for read or write with error history so as to determine whether or not this object sector exists in the error history. In other words, the error history processing section 111 determines whether or not a read/write error has occurred in the object sector prior to the seek operation and read/write operation.

If the object sector exists in the error history, the error information S95 is outputted to the seek timing issuing section 100. When the error information S95 is not input, the seek timing issuing section 100 outputs the seek start permission signal S14 (see FIG. 28) to the seek command executing section 9 at a timing in which an end of the read/write operation and a start of the seek operation occur at the same time, like the previously described operation. On the other hand, if the error information S95 is inputted, the seek timing issuing section 100 outputs the seek start permission signal S14 at a timing in which the seek operation is started after the read/write operation ends, like the conventional storage unit 2. Specifically, after the read/write completion report S06 is inputted, the seek start permission signal S14 is outputted. The reason for this operation is that there is a possibility that a read/write error occurs due to the aforementioned control in which the ends of the read/write operation and the seek operation occur at the same time and for solving this problem.

With the above structure, if the position information S03 is inputted from the position information conversion section 4 shown in FIG. 28 to the position information list producing section 90 in succession, the position information list producing section 90 produces the aforementioned position information list. Then, the position information list producing section 90 outputs the read/write object sector data list S18 generated from the head position information in the position information list to the read/write control section 6 (see FIG. 28) and outputs the position information after change S32 to the seek command issuing section 5 (see FIG. 28).

After that, the seek operation and read/write operation are carried out in the same manner as in the seventh embodiment. Assuming that a read/write error occurs during the read/write operation, the read/write control section 6 outputs the read/write error detection signal S25 to the position information list producing section 90. As a result, the position information list producing section 90 outputs the read/write object sector data S93 about a sector in which the read/write error exists to the error history processing section 111. Then, the error history processing section 111 holds the object sector in which the read/write error exists in the storage section as an error history information.

At the same time, the position information list producing section 90 rearranges position information in the position information list considering the read/write error like in the seventh embodiment. Then, the position information list producing section 90 outputs the position information after change S32 and the read/write object sector data list S18 to the seek command issuing section 5 and read/write control section 6 (see FIG. 28) based on the position information located at the head of the rearranged position information list. Further, the position information list producing section 90 outputs the position information after change S32 and the read/write object sector data list S18 to the error history processing section 111. Consequently, the error history processing section 111 determines whether or not the object sector for read/write exists in the error history.

Assuming that the object sector exists in the error history, the error history processing section 111 outputs the error information S95 to the seek timing issuing section 100. When the read/write completion report S06 is inputted, the seek timing issuing section 100 outputs the seek start permission signal S14 to the seek command executing section 9 shown in FIG. 28. That is, in this case, the seek operation is carried out after the read/write operation ends like the conventional storage unit 2. If no error information S95 is inputted to the seek timing issuing section 100, the seek operation is carried out at the same time when the read/write operation ends like the previously described operation.

As described above, according to the storage unit 110 of the eighth embodiment, in addition to the effects of the first to seventh embodiments, it is possible to prevent an occurrence of a read/write error which results from a control in which the ends of the read/write operation and seek operation are carried out at the same time.

Figure 30:
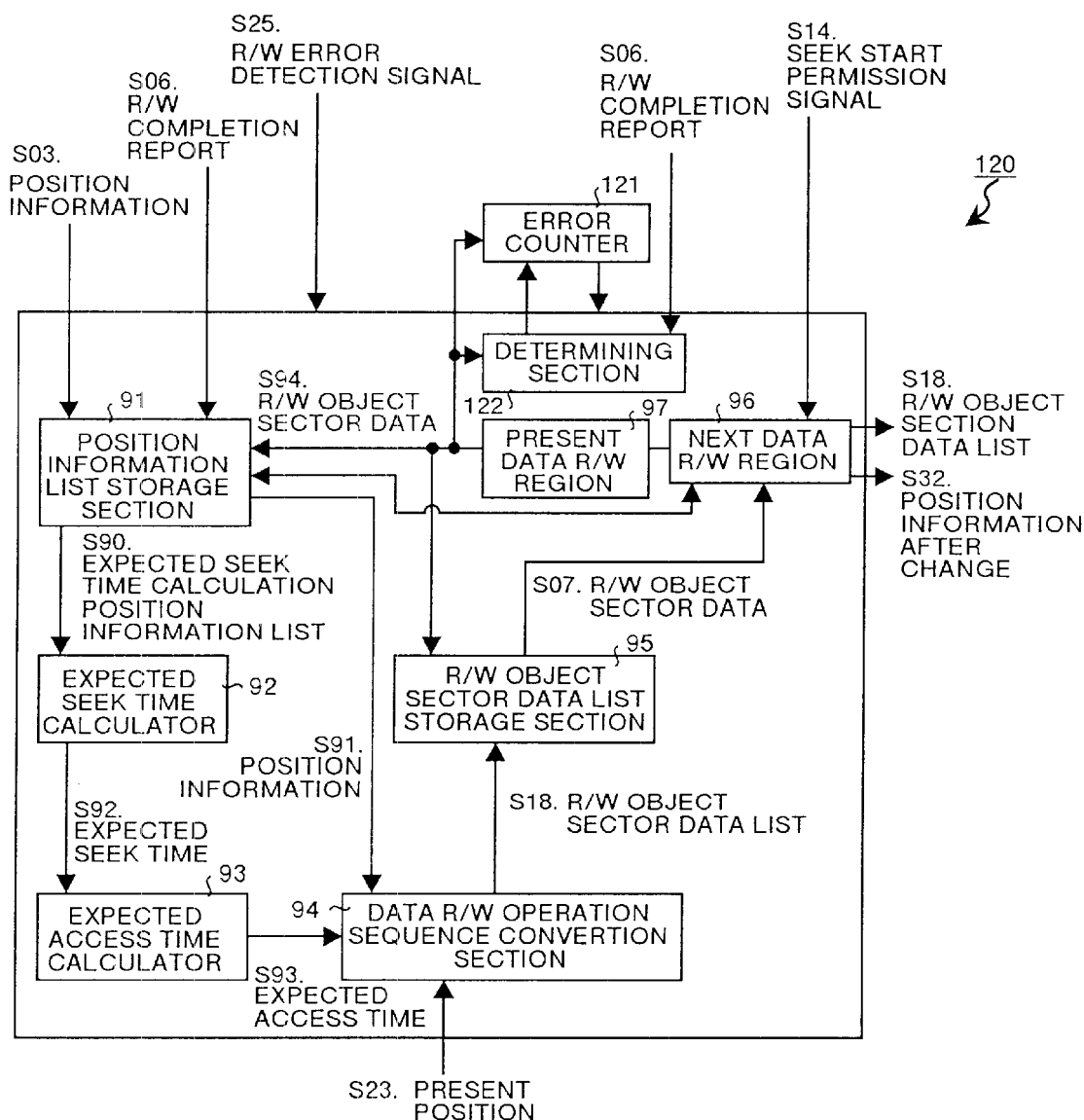
FIG. 30 is a block diagram showing a structure of a storage unit 120 according to a ninth embodiment of the present invention.

FIG. 30 is a block diagram showing a structure of major parts of a storage unit 120 according to a ninth embodiment of the present invention. In this Figure, a position information list producing section corresponding to the position information list producing section 90 shown in FIG. 28 is indicated. In the storage unit 120 of the ninth embodiment, a structure other than the position information producing section shown in the same figure is the same as a structure other than the seek command executing section 9 shown in FIG. 28. In the storage unit 120 of the ninth embodiment, if although the position information in the position information list is rearranged in the same manner as the previously described seventh embodiment after a read error occurs, read errors occur n times, retry of reading operation is repeated to a sector in which the read error exists.

Referring to FIG. 30, a position information list storage section 91 stores a plurality of the position information S03 inputted from the position information conversion section 4 (see FIG. 28) in succession as a position information list. The position information list stored in the position information list storage section 91 is read out to an expected seek time calculator 92 as an expected seek time calculation position information list S90. Here, the expected seek time calculation position information list S90 is used for calculating an expected seek time when the read/write head 13 (see FIG. 28) seeks between cylinders. The position information list stored in the position information list storage section 91 is read out from a data read/write operation sequence conversion section 94 as the position information S91 and used for detecting the size of a sector region in which read/write is to be carried out.

The expected seek time calculator 92 obtains an expected time required for the read/write head 13 (FIG. 28) to seek between the cylinders for every interval between the cylinders according to the expected seek time calculation position information list S90. An expected access time calculator 93 obtains each expected seek time S92 calculated by the expected seek time calculator 92 plus a rotation waiting time as an expected access time S93. Here, the rotation waiting time refers to a rotation time of the recording medium required until an object sector reaches a position below the read/write head 13 since the read/write head 13 seeks from a cylinder to other cylinder.

A data read/write operation sequence conversion section 94 rearranges the order of each position information in the position information list to an order for carrying out the read/write operation based on the present position S23 inputted from a position demodulator 15 (see FIG. 28), position information S91 read out from the position information list storage section 91 (position information list) and an expected access time S93 inputted from the expected access time calculator 93. Specifically, the data read/write operation sequence conversion section 94 recognizes a position of the read/write head 13 on a recording medium from the present position S23 and rearranges the order of each position information considering what order should be taken from the present position for carrying out the seek operation to achieve the read/write operation in the shortest time according to the position information S91 and expected access time S93. Further, the data read/write operation sequence conversion section 94 stores the rearranged list in the read/write object sector data list storage section 95 as the read/write object sector data list S18.

If the seek start permission signal S14 is inputted from the seek timing issuing section 100 (FIG. 28), a next data read/write region 96 reads out a head information in the rearranged read/write object sector data list S18 stored in the next data read/write region 96 as the read/write object sector data S07 from the read/write object sector data list storage section 95 and after that, updates the stored read/write object sector data S07 with a newly read read/write object sector data S07.

If the seek start permission signal S14 is inputted to the next data read/write region 96, it stores the read/write object sector data S07 before updating in parallel to the updating operation in the present data read/write region 97 and outputs that read/write object sector data S07 to the read/write control section 6 shown in FIG. 28 as the read/write object sector data list S18. That is, the read/write object sector data S07 for use in next read/write operation is stored in the next data read/write region 96.

If the read/write object sector data list S18 is rearranged by the data read/write operation sequence conversion section 94, the next data read/write region 96 outputs the updated read/write object sector data S07 to the seek command issuing section 5 (see FIG. 28) as the position information after change S32 at the time of inputting the seek start permission signal S14. The present data read/write region 97 stores the read/write object sector data S07 being used for the present read/write operation. Here, if the read/write completion report S06 is received from the read/write control section 6 (see FIG. 28), the position information list storage section 91 reads out the read/write object sector data S07 from the present data read/write region 97 and deletes the position information in a corresponding position information list.

An error counter 121 counts a frequency of occurrence of the read error and counts up each time when the read/write error detection signal S25 is inputted. When the count value becomes 1 or the read error occurs first, the error counter 121 outputs an initialization signal to the position information list storage section 91, read/write object sector data list storage section 95 and next data read/write region 96. If this initialization signal is outputted, the rearrangement of the position information in the position information list described later is carried out.

When the count value becomes 'n' which means that the read error has occurred 'n' times, then the error counter 121 outputs a retry signal to the present data read/write region 97. A determining section 122 determines whether or not the read operation from this object sector is carried out properly during the retry processing to an object sector in which the read error occurs 'n' times. Specifically, when the read/write object sector data S94 is inputted from the present data read/write region 97 and the read/write completion report S06 is inputted from the read/write control section 6 (see FIG. 28), the determining section 122 recognizes that the read operation is carried out properly and then resets the count value in the error counter 121.

With the above structure, if the position information S03 is inputted to the position information list storage section 91 in succession, the position information list storage section 91 stores the position information S03 as the position information list. Then, the position information list stored in the position information list storage section 91 is read out by the expected seek time calculator 92 as the expected seek time calculation position information list S90 and read out by the data read/write operation sequence conversion section 94 as the position information S91.

The expected seek time calculator 92 obtains an expected seek time of each interval between the cylinders from the expected seek time calculation position information list S90 and then outputs this to the expected access time calculator 93 as the expected seek time S92. Then, this expected access time calculator 93 obtains each expected seek time S92 plus a rotation waiting time as the expected access time S93 and after that, outputs it to the data read/write operation sequence conversion section 94.

Then, the data read/write operation sequence conversion section 94 recognizes a position of the read/write head 13 on the recording medium from the present position S23 and by considering what order should be taken for carrying out the seek operation from the present position so as to achieve the read/write operation in the shortest time. The data read/write operation sequence conversion section 94 then arranges each position information so as to produce the read/write object sector data list S18, and stores this in the read/write object sector data list storage section 95. The head information of the read/write object sector data list S18 stored in the read/write sector data list storage section 95 is stored in the next data read/write region 96 as the read/write object sector data S07. In this case, it is assumed that a read/write object sector data corresponding to an object sector in which the read/write operation is currently performed is stored in the present data read/write region 97.

If the seek start permission signal S14 is inputted, the next data read/write region 96 stores the read/write object sector data S07 in the present data read/write region 97 and outputs it to the read/write control section 6 shown in FIG. 28 as the read/write object sector data list S18. Consequently, the read/write operation is carried out in the same manner as already explained above.

If a read error occurs in the object sector during the read/write operation, the read/write error detection signal S25 is inputted from the read/write control section 6 to the error counter 121. As a result, the count value of the error counter 121 becomes 1 so that the error counter 121 outputs the initialization signal to the position information list storage section 91, the read/write object sector data list storage section 95 and the next data read/write region 96. Consequently, each data stored in the position information list storage section 91, read/write object sector list data storage section 95 and next data read/write region 96 is initialized.

Then, the data read/write operation sequence conversion section 94 rearranges the position information list based on the present position S23 after the read error has occurred and stores this result in the read/write object sector data storage section 95 as the read/write object sector data list S18. After this, the read/write operation and seek operation are carried out based on the rearranged position information list (read/write object sector data list S18). Further, each time when the read/write error detection signal S25 is inputted, the error counter 121 counts up and the above-described rearrangement processing is repeated.

Assuming that the read error has occurred 'n' times about an object sector, the count value of the error counter 121 becomes 'n'. In such a case, the error counter 121 outputs a retry signal to the present data read/write region 97. Consequently, the present data read/write region 97 outputs the read/write object sector data S94 relating to an object sector in which the read error exists to the data read/write object sector list storage section 95. The read/write object sector data S94 inputted to the data read/write object sector list storage section 95 is stored in the next data read/write region 96. The aforementioned read/write object sector data S94 is outputted from the next data read/write region 96 to the read/write control section 6 (see FIG. 28) as the read/write object sector data list S18 and a retry operation to the object sector in which the read error has occurred is carried out. Each time when the read/write error detection signal S25 is inputted to the error counter 121, the aforementioned retry operation is repeated.

If read operation is achieved to an object sector normally during a retry operation, the read/write completion report S06 is inputted to the determining section 122 from the read/write control section 6 (see FIG. 28). Because the read/write object sector data S94 is also inputted from the present data read/write region 97 to the determining section 122, the determining section 122 resets the count value in the error counter 121. As a result, the retry operation is terminated. After that, if the read/write error detection signal S25 is inputted to the error counter 121, the position information list is rearranged and if the read error occurs more than 'n' times, the retry operation is carried out.

As described above, in the storage unit 120 of the ninth embodiment, when the read error is not eliminated even if the rearrangement of the position information list is carried out, then the retry operation is executed as other method. Thus, the frequency of occurrence of the read error can be reduced.

Figure 31:
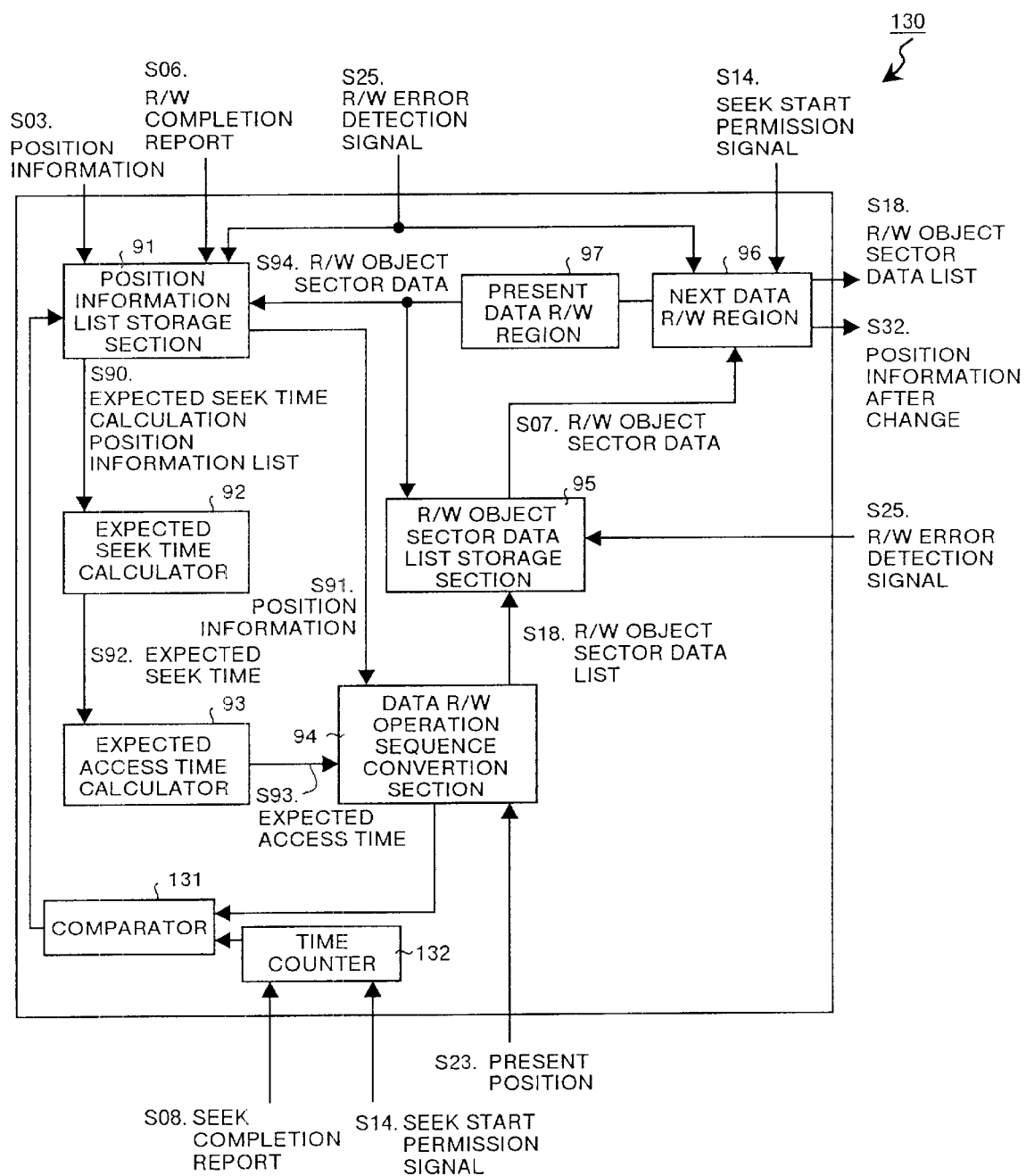
FIG. 31 is a block diagram showing a structure of a storage unit 130 according to a tenth embodiment of the present invention.

FIG. 31 is a block diagram showing a structure of a storage unit 130 according to a tenth embodiment. Same reference numerals are provided to the sections corresponding to those in FIG. 30 and a description thereof is omitted. A comparator 131 and a time counter 132 are provided instead of the error counter 121 shown in FIG. 30 and determining section 122. In the storage unit 130 of the tenth embodiment, if the read/write operation is delayed because the seek time relative to the object sector exceeds an expected time, the order of the position information in the position information list is rearranged.

A time counter 132 shown in FIG. 31 functions as a timer. If the seek start permission signal S14 is inputted from the seek timing issuing section 100 (see FIG. 28), the time counter 132 starts count-up and when the seek completion report S08 is inputted from the detailed target position setting section 8 (see FIG. 28), terminates the count. Further, the time counter 132 outputs a count result to the comparator 131 as data about achieved seek time. This comparator 131 receives the expected access time S93 (expected seek time) relative to the object sector from the data read/write operation sequence conversion section 94 and compares this expected access time S93 with the seek time achieved from the time counter 132. Specifically, if the read/write head 13 (see FIG. 28) could not arrive at an target position because the actual seek time exceeded the expected access time S93, the comparator 131 outputs an access incompletion signal to the position information list storage section 91. When the aforementioned access incompletion signal is inputted, the position information list storage section 91 rearranges the position information in the position information list.

With the above structure, if the seek start permission signal S14 is inputted to the time counter 132, the count-up of the time counter 132 is started. At the same time, if the seek start permission signal S14 is inputted to the next data read/write region 96, the read/write object sector data list S18 is outputted from the next data read/write region 96 and the expected access time S93 about the object sector corresponding to the read/write object sector data list S18 is inputted to the comparator 131 from the data read/write operation sequence conversion section 94. Consequently, the seek operation about the object sector is started. The comparator 131 compares an output (actual seek time) of the time counter 132 with the expected access time S93.

Let us assume that an error has occurred during the seek operation and due to this completion of the seek operation has been delayed. In this case, a timing for inputting the seek completion report S08 to the time counter 132 will be delayed so that an output (actual seek time) of the time counter 132 exceeds the expected access time S93. At this time, the comparator 131 outputs the access incompletion signal to the position information list storage section 91. Consequently, the position information list storage section 91 recognizes that the access is incomplete and then rearranges the position information in the position information list. If this rearrangement is carried out, the sequence of the seek operation is changed like the previously described operation.

As described above, in the storage unit 130 of the tenth embodiment, if an access to an object sector cannot be achieved because the actual seek time exceeds an expected time, the sequence of the seek operation is changed by rearranging the position information list. Therefore, it is possible to improved a condition in which no access can be achieved.

Figure 32:
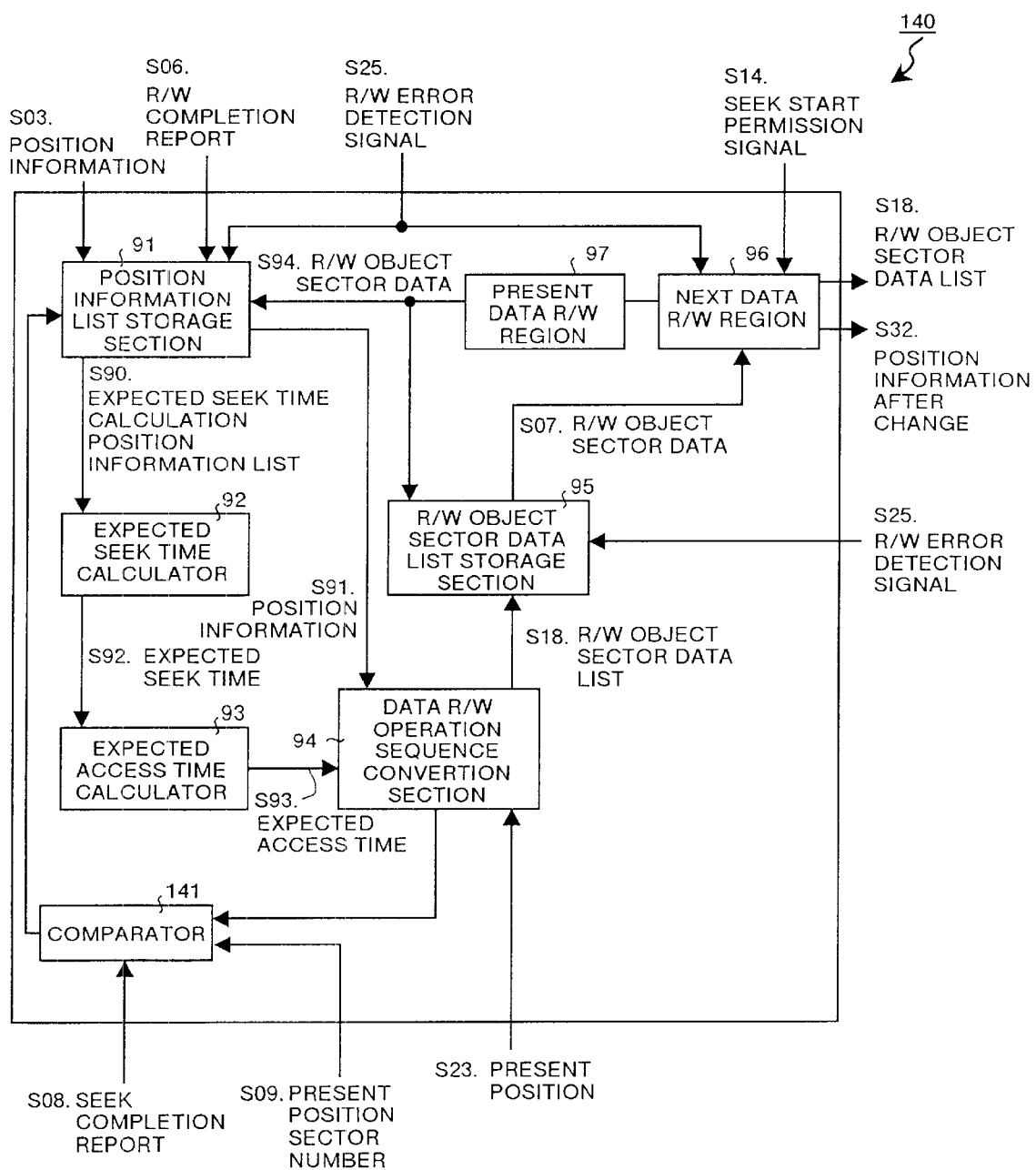
FIG. 32 is a block diagram showing a structure of a storage unit 140 according to an eleventh embodiment of the present invention.

FIG. 32 is a block diagram showing a structure of a storage unit 140 according to an eleventh embodiment of the present invention. Same reference numerals are provided to the sections corresponding to those in FIG. 31 and a description thereof is omitted. A comparator 141 is provided instead of the comparator 131 and time counter 132 shown in FIG. 31. This comparator 141 compares a number of an object sector to be accessed with the present position sector number S09 (see FIG. 28), and if both the numbers do not match with each other when the seek completion report S08 is inputted or the seek operation is completed, then outputs the access incompletion signal to the position information list storage section 91 in the same manner as the previously described tenth embodiment.

With the above structure, if the seek start permission signal S14 is inputted to the next data read/write region 96, the read/write object sector data list S18 is outputted from the next data read/write region 96, and a sector number of an object sector corresponding to the read/write object sector data list S18 is inputted from the data read/write operation sequence conversion section 94 to the comparator 141. Consequently, the seek operation for the object sector is started. During this seek operation, the present position sector number S09 is inputted to the comparator 141.

Let us assume that an error has occurred during the seek operation and due to this completion of the seek operation has been delayed. In this case, a timing for inputting the seek completion report S08 to the comparator 141 delays so that the present position sector number S09 does not agree with the sector number of the object sector. That is, in this case, currently an access to the object sector cannot be made within an expected access time. Consequently, the access incompletion signal is outputted to the position information list storage section 91 from the comparator 141. Thus, the position information list storage section 91 recognizes that the access is incomplete and after that, rearranges the position information in the position information list. By this rearrangement, the sequence of the seek operation is changed like the previously described operation.

As described above, in the storage unit 140 of the eleventh embodiment, if an access to an object sector cannot be made because the actual seek time exceeds an expected time, by comparing the present position sector number S09 with a sector number of the object sector, the position information list is rearranged so as to change the sequence of the seek operation. Therefore, it is possible to improve a condition in which no access can be made.

As described above, according to the first aspect of the present invention, when the seek operation is to be carried out, the control unit carries out a processing necessary for the seek operation before the read/write operation ends. That is, the processing necessary for the seek operation is carried out in parallel to the read/write operation. Therefore, a time required for the processing necessary for the seek operation is saved, so that data transmission efficiency is improved by an amount corresponding to the time required for the processing necessary for the seek operation and seek time required for the seek operation is reduced.

Further, according to the second aspect of the present invention, when the seek operation is to be carried out, the timing unit obtains a timing for terminating the processing when the read/write operation is terminated. Then, the driving unit drives the seek unit at the above timing. Therefore, in this case, the seek operation is carried out at the same time when the read/write operation ends. Therefore, the data transmission time is reduced by an amount corresponding to a time required for a processing necessary for the seek operation, so that data transmission efficiency is improved by the above time interval and then the seek time necessary for the seek operation is reduced.

Further, according to the third aspect of the present invention, the initial value is counted down according to the sector pulse that is inputted each time when the head passes a sector on the recording medium. Further, when this count value becomes zero, the seek unit is driven by the driving unit which is also the time when the read/write operation ends, and in this way the seek operation is carried out. Therefore, the data transmission efficiency is improved by an amount corresponding to time duration necessary for the seek operation and the seek time necessary for the seek operation is reduced.

Further, according to the fourth aspect of the present invention, the seek unit is driven by the driving unit at a timing at which the sector position in which the read/write operation is terminated matches with a sector position in which the head is positioned which is also the time at which the read/write operation is terminated, and in this way the seek operation is carried out. Therefore, the data transmission efficiency is improved by an amount corresponding to time duration necessary for the seek operation and the seek time necessary for the seek operation is reduced.

Further, according to the fifth aspect of the present invention, the initial value is counted down according to the byte pulse that is inputted each time when the head passes a byte on the recording medium. Further, when this count value becomes zero, the seek unit is driven by the driving unit which is also the time when the read/write operation ends, and in this way the seek operation is carried out. Therefore, the data transmission efficiency is improved by an amount corresponding to time interval necessary for the seek operation and the seek time necessary for the seek operation is reduced. Further, because a byte pulse has a period shorter than the sector pulse, the resolution can be improved.

Further, according to the sixth aspect of the present invention, the seek unit is driven by the driving unit at a timing at which the byte position in which the read/write operation terminates matches with the byte position in which the head is positioned which is also the time when the read/write operation is terminated, and in this way the seek operation is carried out. Therefore, the data transmission efficiency is improved by an amount corresponding to time duration necessary for the seek operation and the seek time necessary for the seek operation is reduced. Further, because a byte is used which is shorter than the sector, the resolution can be improved.

Further, according to the seventh aspect of the present invention, the seek unit is driven by the driving unit at a timing in which the counting result of the timer matches with the time at which the read/write operation is terminated which is also the time when the read/write operation is terminated, and in this way the seek operation is carried out. Therefore, the data transmission efficiency is improved by an amount corresponding to time necessary for the seek operation and the seek time necessary for the seek operation is reduced. Further, because a timer asynchronous with a rotation of the recording medium is used, the seek operation can be carried out at a high precision without being affected by a deflection of the above rotation.

Further, according to the eighth aspect of the present invention, the seek unit is driven by the driving unit at a timing at which the time required for the read/write operation matches with the counting result of the timer which is also the time when the read/write operation is terminated, and in this way the seek operation is carried out. Therefore, the data transmission efficiency is improved by an amount corresponding to time necessary for the seek operation and the seek time necessary for the seek operation is reduced. Further, because a timer asynchronous with a rotation of the recording medium is used, the seek operation can be carried out at a high precision without being affected by a deflection of the above rotation.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A storage unit comprising:
   a head for carrying out read/write operation with respect to a recording medium;
   a seek unit for moving said head from the present position on said recording medium to a target position; and
   a control unit for carrying out a processing necessary for achieving the seek operation before termination of the read/write operation by said head and for driving said seek unit when the processing necessary for achieving the seek operation is terminated.

2. The storage unit according to claim 1 wherein said control unit includes
   a timing unit for obtaining a timing at which the processing necessary for achieving the seek operation is terminated when the read/write operation is terminated, based on an object sector data of an object sector to be subjected to the read/write and information recorded in said recording medium to be read by said head; and
   a driving unit for driving said seek unit at the obtained timing.

3. The storage unit according to claim 2 wherein said timing unit obtains a difference between a sector position in which the read/write operation is terminated and a sector position in which said head is located as an initial value, counts down this initial value based on a sector pulse that is inputted each time when said head passes a sector position on said recording medium, and adopts a time at which the count value becomes zero as the obtained timing.

4. The storage unit according to claim 2 wherein said timing unit compares a sector position in which said read/write operation is terminated and a sector position in which said head is located, and adopts a time at which both of them match with each other as the obtained timing.

5. The storage unit according to claim 2 wherein said timing unit obtains a difference between a byte position in which said read/write operation is terminated and a byte position in which said head is located as an initial value, counts down this initial value based on a byte pulse that is inputted each time when said head passes a byte position on said recording medium, and adopts a time at which the count value becomes zero as the obtained timing.

6. The storage unit according to claim 2 wherein said timing unit compares a byte position in which said read/write operation is terminated with a byte position in which said head is located and adopts a time when both of them match with each other as the obtained timing.

7. The storage unit according to claim 2 further comprises a timer for counting time, wherein said timing unit compares a time at which the read/write operation terminates with the time counted in said timer, and adopts a time when both of them match with each other as the obtained timing.

8. The storage unit according to claim 2 further comprises a timer for counting time, wherein said timing unit compares a time required for the read/write operation with the time counted in said timer, and adopts a time when both of them match with each other as the obtained timing.

\* \* \* \* \*